United States Patent
Mannheim Astete et al.

(10) Patent No.: US 11,718,072 B2
(45) Date of Patent: Aug. 8, 2023

(54) AUTOMOTIVE LAMINATE WITH IMPROVED OPTICS

(71) Applicant: AGP America S.A., Ciudad de Panama (PA)

(72) Inventors: Mario Arturo Mannheim Astete, Lima (PE); Charles Stephen Voeltzel, Lima (PE); Andres Fernando Sarmiento Santos, Lima (PE); Pierre Mezeix, Lima (PE); Jean-Marie Le Ny, Lima (PE)

(73) Assignee: AGP America S.A.

( * ) Notice: Subject to any disclaimer, the term of this patent is extended or adjusted under 35 U.S.C. 154(b) by 0 days.

(21) Appl. No.: 16/640,833

(22) PCT Filed: Aug. 23, 2018

(86) PCT No.: PCT/IB2018/056407
§ 371 (c)(1),
(2) Date: Feb. 21, 2020

(87) PCT Pub. No.: WO2019/038723
PCT Pub. Date: Feb. 28, 2019

(65) Prior Publication Data
US 2020/0376815 A1 Dec. 3, 2020

Related U.S. Application Data

(60) Provisional application No. 62/558,392, filed on Sep. 14, 2017, provisional application No. 62/558,405, (Continued)

(30) Foreign Application Priority Data

Nov. 28, 2017 (CO) .................. NC2017/0012234

(51) Int. Cl.
*B32B 17/10* (2006.01)
*B32B 37/12* (2006.01)
(Continued)

(52) U.S. Cl.
CPC .. *B32B 17/10917* (2013.01); *B32B 17/10036* (2013.01); *B32B 17/10091* (2013.01);
(Continued)

(58) Field of Classification Search
CPC ........ B32B 17/10917; B32B 17/10036; B32B 17/10091; B32B 17/10137;
(Continued)

(56) References Cited

U.S. PATENT DOCUMENTS 5,219,630 A * 6/1993 Hickman .......... B32B 17/10366
156/107
2004/0160688 A1 8/2004 Noguchi et al.
(Continued)

FOREIGN PATENT DOCUMENTS

WO 2014057224 A1 4/2014
WO 2016079459 A1 5/2016
WO 2017106081 A1 6/2017

*Primary Examiner* — Catherine A. Simone
(74) *Attorney, Agent, or Firm* — The Morales Law Firm; Joseph L. Morales

(57) ABSTRACT

The use of camera based safety systems is growing at a rapid rate in modern automobiles. As the industry moves towards vehicles with full autonomous capability, the number of cameras required and the resolution of the cameras are both increasing. At the same time, windshields, where many of the cameras are mounted, are becoming larger and more complex in shape. This presents problems in the area of camera optics. Variations in the thickness of the glass and the plastic layer, surface mismatch, surface texture and the design curvature of the glass in conjunction with the often low installation angle, can reduce the optical clarity of the camera optics. These optical aberrations are further exacer- (Continued)

bated during the lamination process when the layers are bonded together under pressure. The laminate of the invention utilizes a cutout in the plastic bonding layer in side of the laminate, preferable in the camera field of view. A laminating resin is used to fill the gap left by the cutout between the two glass layers.

19 Claims, 26 Drawing Sheets

Related U.S. Application Data filed on Sep. 14, 2017, provisional application No. 62/558,381, filed on Sep. 14, 2017, provisional application No. 62/558,429, filed on Sep. 14, 2017, provisional application No. 62/558,379, filed on Sep. 14, 2017, provisional application No. 62/549,011, filed on Aug. 23, 2017.

(51) Int. Cl.
    *C03B 25/02*     (2006.01)
    *C03C 21/00*     (2006.01)

(52) U.S. Cl.
    CPC .. *B32B 17/10137* (2013.01); *B32B 17/10293* (2013.01); *B32B 17/10449* (2013.01); *B32B 17/10761* (2013.01); *B32B 37/1284* (2013.01); *B32B 2307/412* (2013.01); *B32B 2605/006* (2013.01); *C03B 25/025* (2013.01); *C03C 21/002* (2013.01)

(58) Field of Classification Search
    CPC ........ B32B 17/10293; B32B 17/10449; B32B 17/10761; B32B 37/1284; B32B 2307/412; B32B 2605/006; C03B 25/025; C03C 21/002
    See application file for complete search history.

(56) References Cited

U.S. PATENT DOCUMENTS

| | | |
|---|---|---|
| 2005/0238857 A1 | 10/2005 | Day |
| 2006/0182980 A1 | 8/2006 | Barton et al. |
| 2007/0154705 A1 | 7/2007 | Doeppner et al. |
| 2009/0098354 A1 | 4/2009 | Torr |
| 2011/0199674 A1* | 8/2011 | Melcher ............ B32B 17/10761 359/359 |
| 2017/0008377 A1 | 1/2017 | Fisher et al. |

\* cited by examiner

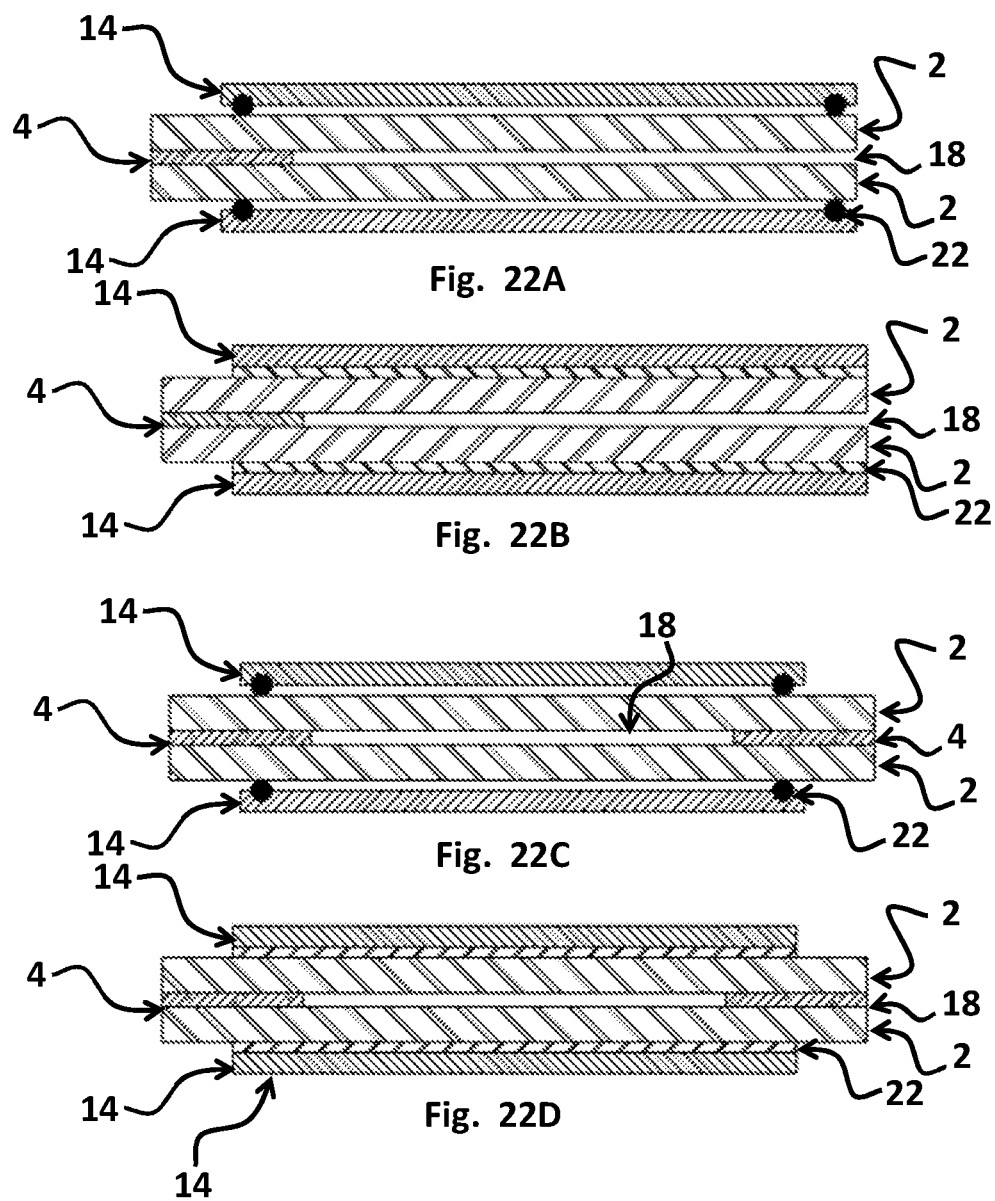

AUTOMOTIVE LAMINATE WITH IMPROVED OPTICS

FIELD OF THE INVENTION

This invention relates to the field of laminated automotive glazing.

BACKGROUND OF THE INVENTION

The use of camera based safety systems, requiring a wide field of view and a high level of optical clarity, is growing at a rapid rate. As the industry moves towards full autonomous capability, the number of cameras and the resolution of the cameras are both increasing. At the same time, windshields, where many of the cameras are mounted, are becoming larger and more complex in shape.

The main cameras require a high, forward looking field of view and so must typically be mounted on the windshield and in the wiper area. Early initial applications were for night-vision. Today, camera based systems are used to provide a wide array of safety functions including adaptive cruise control, obstacle detection, lane departure warning and support for autonomous operation. Many of these applications require the use of multiple cameras. A clear undistorted field of view, with minimal double imaging and excellent MTF (Modulation Transfer Function, a measure of how well a lens maps an image to a sensor), is especially critical for camera based systems to perform as intended. It is essential for these systems to be able to quickly differentiate between objects, capture text, identify signage, and operate with minimal lighting. Further, as the resolution of the cameras increases, the need for a clear distortion free field of view also increases.

Laminated windshields are made by bonding two sheets of annealed glass together using an interlayer which is a thin thermoplastic sheet to bond the glass layers together. Annealed glass is glass that has been slowly cooled from the bending temperature down through the glass transition range during the bending process. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. On impact, the plastic bonding 4 layer also helps to prevent penetration by objects striking the laminate from the exterior and in the event of a crash occupant retention is improved.

This laminated construction presents problems in the area of optics. For one, the camera is looking out through at least two layers of bent glass bonded together by a third layer of plastic. Secondary reflections from the multiple surfaces can result in double image. The curvature of the glass, in conjunction with the often-low installation angle, can also contribute to double image as well as further reducing the optical clarity of the field of view.

Further problems arise from variations in the thickness of the glass and the plastic layer used to bond the two glass layers to each other.

Most of the worlds' flat glass is produced by the float glass process, first commercialized in the 1950s. With the float glass process, the raw ingredients are melted in a large refractory vessel and then the molten glass is extruded from the vessel onto a bath of molten tin where the glass floats. The thickness of the glass is controlled by the speed at which the molten glass is drawn from the vessel. Float glass thickness can typically vary by +/−50 µm over a short distance due to what is known as draw line distortion. This is the result of the mechanical means used to transform the molten glass into a thin ribbon on the flat glass float line. As the glass cools and hardens, the glass ribbon transfers to rollers.

There is also variation in the thickness of the plastic bonding 4 layer (interlayer). Automotive interlayers are made by an extrusion process with a thickness tolerance to accommodate process variation. A smooth surface tends to stick to the glass making it difficult to position the sheet relative to the glass and also tends to trap air. To facilitate the handling of the plastic sheet and the removal of air (de-airing) from the laminate, the surface of the plastic is normally embossed contributing additional variation to the sheet.

While these variations in of themselves can cause distortion, the optical aberrations are further exacerbated by the lamination process. During lamination, the two layers of glass are forced together under pressure and permanently held there by the plastic bonding layer. Any surface irregularities or thickness variation will result in residual stress which is locked into the glass. This is especially a problem due to the material properties of glass.

Glass is a transparent isotropic substance. Physical properties, such as the index of refraction, do not depend on its orientation. However, when a mechanical stress is applied to glass, it becomes anisotropic, in the case of glass, the index of refraction will vary with stress. This phenomenon is known as mechanical birefringence, photo elasticity, or stress birefringence. The induced birefringence in glass is proportional to the stress applied.

When glass is placed in tension or compression, it will display two different indices of refraction that depend on polarization; one refraction index for a particular axis of polarization and another one for its perpendicular axis. For an incident non-polarized light in a birefringence material, half of the light will be affected by one refraction index and the other half by a different refraction index, producing an effect commonly known as "double image" and distortion. This property is well known in the industry and used to measure the residual stress in glass through the use of a polarized light source and a polarizing filter.

Another problem presented by cameras that are mounted near the top of the windshield is that the tinted sunshade interferes with the camera systems. Therefore, on some windshields that require camera systems the sunshade must be eliminated or provided for by means other than those that are typically and economically employed. Some of the alternate means that have been used include printing of the sunshade on the interlayer or on the glass itself as well as mechanical shades.

It would be desirable to overcome these limitations by providing a laminated glazing with superior optical quality and performance.

BRIEF SUMMARY OF THE INVENTION

It is an object of the invention to provide a laminated glazing with superior optical quality made by providing an exterior glass layer, an interior glass layer and at least one plastic bonding layer between the exterior glass layer and the interior glass layer; making at least one cutout area in said at least one plastic bonding layer; placing an insert sized to fit within the cutout area of said at least one plastic bonding layer; laminating the glazing; injecting a laminated resin into the cutout area; and curing the resin. The insert is made from a material that the plastic will not adhere to and which will not mark or damage the glass.

It is another object of the invention to provide a laminated glazing with superior optical quality made by providing an exterior glass layer, an interior glass layer and at least one plastic bonding layer between the exterior glass layer and the interior glass layer; making at least one cutout area in said at least one plastic bonding layer; providing a set of at least two plates sized larger than the cutout area; mounting the plates to the opposite glass surfaces with sealing means; laminating the glazing; removing the plates from laminate after lamination process; filing the void left by the plate with a laminating resin; and curing the resin.

It is still another object of the invention to provide a laminated glazing with superior optical quality made by providing an exterior glass layer, an interior glass layer and at least one plastic bonding layer between the exterior glass layer and the interior glass layer; making at least one cutout area in said at least one plastic bonding layer; pre-laminating the glazing; creating an opening through the interior glass layer; injecting a laminated resin into the cutout area through the opening; curing the resin; and laminating the glazing.

It is still another object of the invention to provide a laminated glazing with superior optical quality made by providing an exterior glass layer, an interior glass layer and at least one plastic bonding layer between the exterior glass layer and the interior glass layer; laminating the glazing; removing at least one cutout area in said at least one plastic bonding layer by an ablation process to create a fill channel that extends to the edge of the glass; injecting a laminated resin through the channel; and curing the resin.

Advantages:
Superior optical quality:
  Reduces distortion due deviation in curvature of glass;
  Reduces distortion due to surface mismatch;
  Reduces distortion due to birefringence;
  Reduces distortion due variation in thickness of glass and interlayer;
  Reduces double image;
Reduces residual stress;
Reduces probability of breakage;
Supports cameras with higher resolution;
Fabricated using standard automotive glass processes and equipment.
Allows use of extruded sunshade plastic bonding interlayer.

BRIEF DESCRIPTION OF DRAWINGS

FIG. 22A Cross section void to edge and Plate with O-ring according to a third embodiment.
FIG. 22B Cross section void to edge and Plate with gasket according to a third embodiment.
FIG. 22C Cross section void not to edge and Plate with O-ring according to a third embodiment.
FIG. 22D Cross section void not to edge and Plate with gasket according to a third embodiment.

REFERENCE NUMERALS

Figure 1:
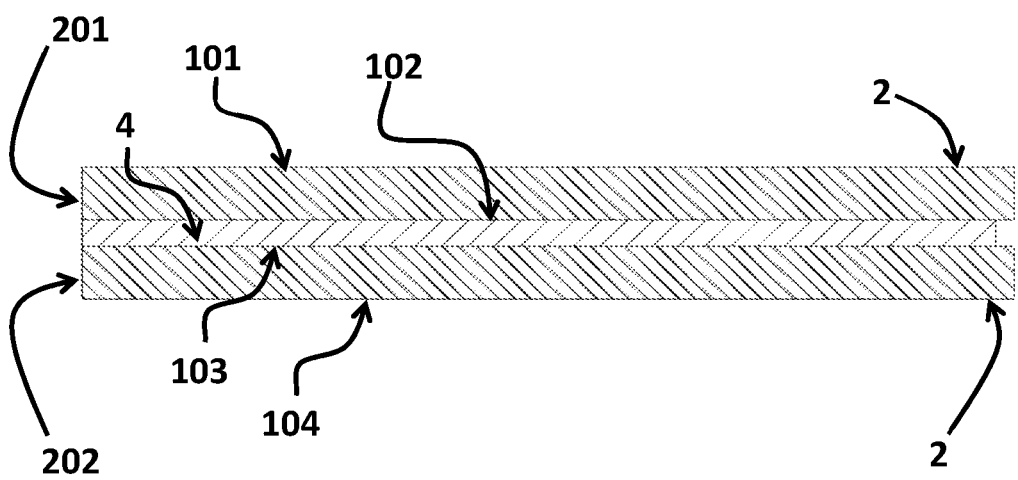
FIG. 1 Cross section of a typical laminate construction.
Figure 2:
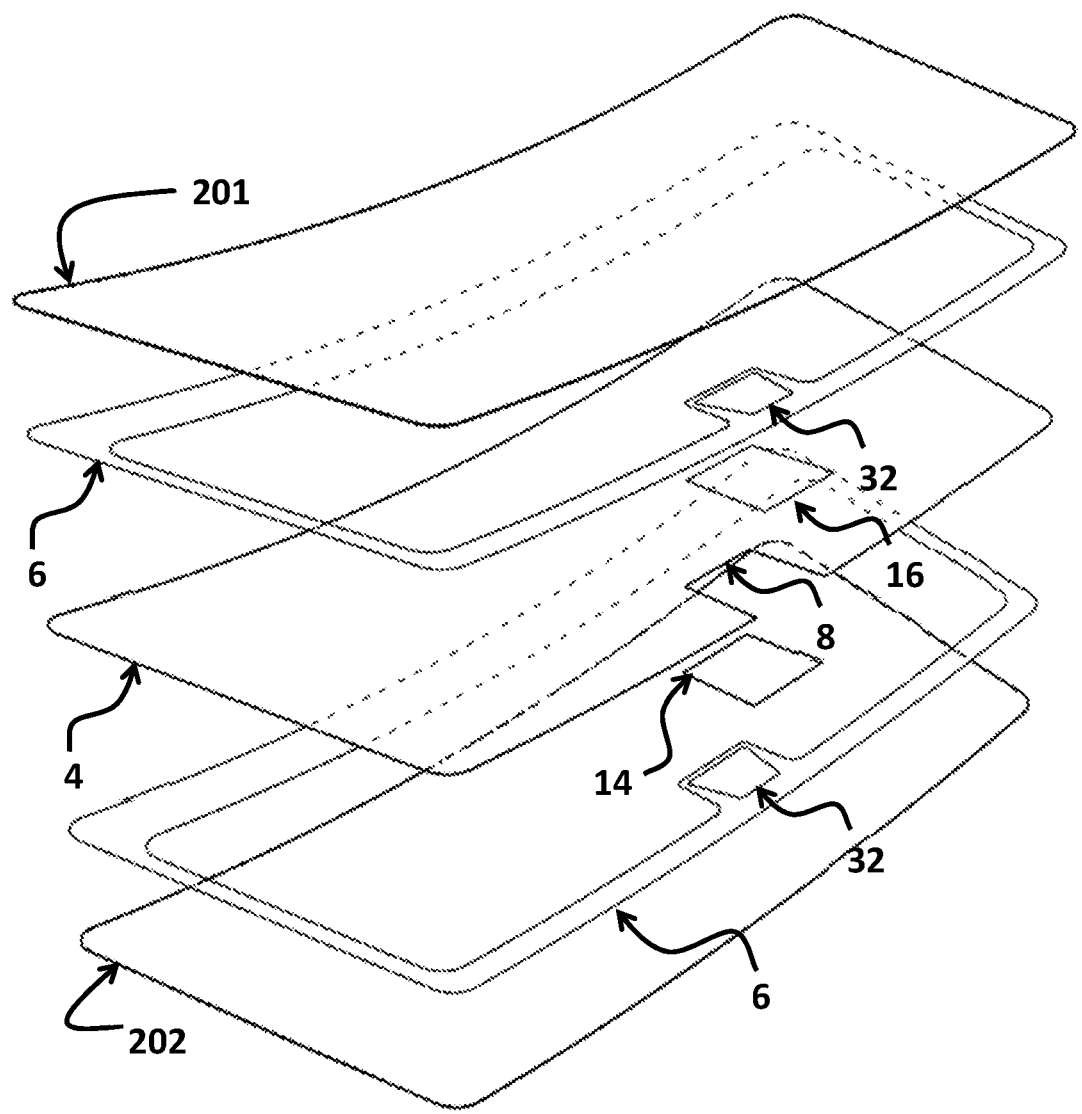
FIG. 2 Exploded view of a laminate according to a first embodiment.
Figure 3A:
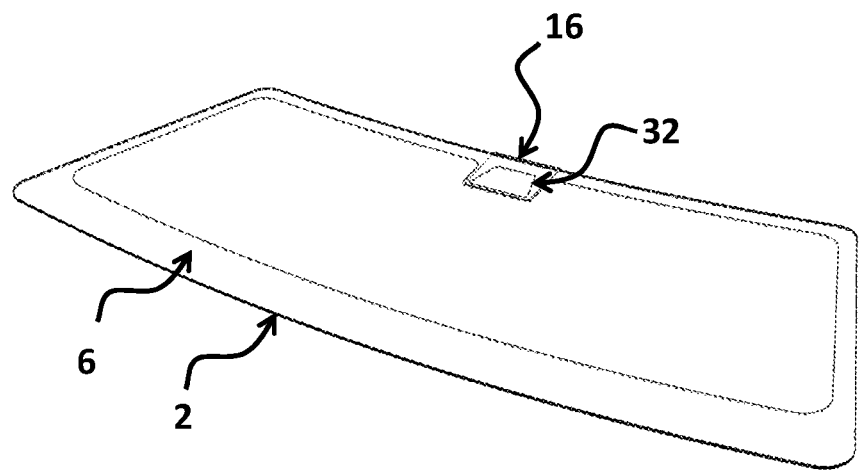
FIG. 3A Isometric view of a windshield according to a first embodiment.
Figure 3B:
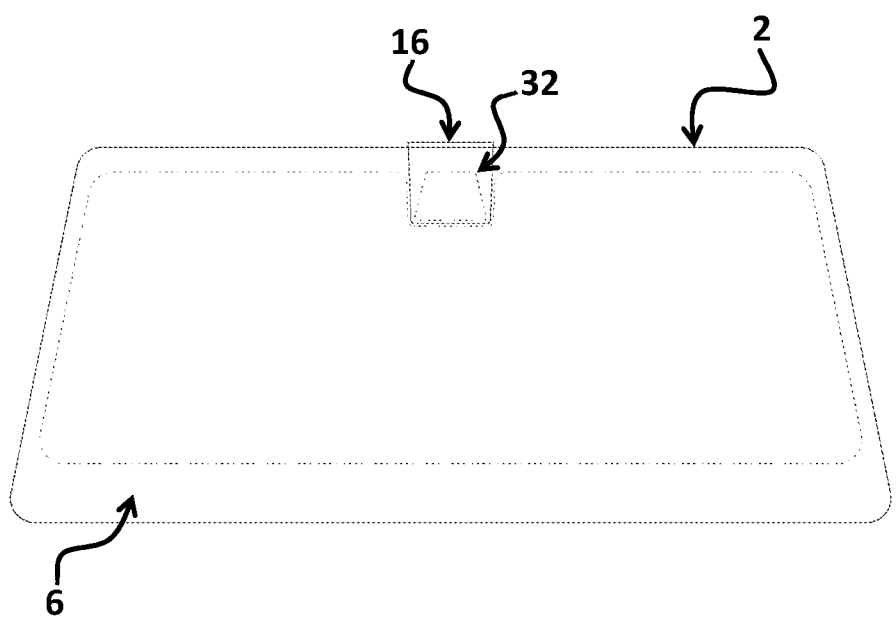
FIG. 3B Front view of the embodiment of the windshield depicted in FIG. 3A.

2 Glass
4 Plastic Bonding Layer/Adhesive Layer

6 Obscuration
8 Cutout
12 Fill Tube
14 Insert
15 Plate
16 Laminating resin
18 Gap/void
20 Perforation
21 Sunshade
22 Reinforcement
23 Seal/O-ring/Gasket
24 Hole
26 Notch
26 LASER
27 LASER Oblation
28 Tab
30 Tapered Insert
32 Opening in obscuration for camera
101 Surface one
102 Surface two
103 Surface three
104 Surface four
201 Outer layer
202 Inner layer

DETAILED DESCRIPTION OF THE INVENTION

In the drawings and discussion, the following description and terminology is used to describe the method for producing a laminated glazing and the structural characteristics of the configuration of a laminated glazing as illustrated in FIG. 1. A typical automotive laminate is comprised of at least two different layers of glass separating by plastic layers located between them. In the embodiment shown in this Figure, the exterior or outer glass layer 201 and the interior or inner glass layer 202 are permanently bonded together by a plastic layer 4 (interlayer). It should be understood that laminated glazings can be formed having more than two glass layers and multiple plastic bonding layers.

In the embodiment shown in FIG. 1, the glass surface that is on the exterior of the vehicle is referred to as surface one 101 or the number one surface. The opposite face of the exterior glass layer 201 is surface two 102 or the number two surface. The glass surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4.

Hence, the first step of the method of the present invention is to provide an exterior glass layer 201, an interior glass layer 202 and at least one plastic bonding layer 4. The plastic bonding layer 4 has the primary function of bonding the major faces of adjacent layers to each other. The material selected is typically a clear plastic when bonding to another glass layer. For automotive use, the most commonly used plastic bonding layer 4 or interlayer is polyvinyl butyl (PVB). In addition to polyvinyl butyl, ionoplast polymers, ethylene vinyl acetate (EVA), cast in place (CIP) liquid laminating resin and thermoplastic polyurethane (TPU), among others. Interlayers are available with enhanced capabilities beyond bonding the glass layers together. For instance, the present invention may include interlayers designed to dampen sound, provide tint, and which absorb or reflect solar energy. Such interlayers are comprised whole or in part of a layer of plastic that is softer and more flexible than those materials normally used or the ones described above.

The laminating resin serves the same function as the plastic bonding layer. The laminating resin bonds the opposite faces of the glass layers together. By filling the void between the layers with a liquid after bending and lamination, the residual stress in the glass is reduced improving the optical clarity of the laminate in that area.

The laminating resin of the embodiments is essentially clear in the cured state. It has an index of refraction matched to glass and a coefficient of thermal expansion similar to that of the PVB interlayer also used in the embodiments. The resin is cured by means of exposure to an ultra-violet light source. Many suitable laminating resins are known in the art and may be substituted, as appropriate, without deviating from the concept of the invention. The resin may be comprised of natural or synthetic, organic or inorganic compounds including non-petrochemical derived compounds and employ various curing means including but not limited to: evaporation, catalytic and heat and any combination of the prior. Viscosity may vary over a wide range as well depending upon the filing means used and cycle time required. Compounds that are not classified as resins may exist which can serve the same function. Such compounds many also be used without deviating from the concept of the invention.

The laminating resin may further be formulated so as to enhance and compliment the function of the camera through changes to the index of refraction, the absorption, reflectance, transmittance, frequency response and other the optical properties of the cured resin. As an example, absorbers may be added to the resin to protect the camera elements from certain wavelengths of light. As another example, the resin may be altered to improve the optical sensitivity to red and green so as to improve detection of traffic signals. As can be appreciated, a wide variety of functions can be introduced in much the same manner as when conventional filters are used with camera optics.

Visible light transmission through the windshield must be at least 70% in the driver's primary field of vision as defined by regulatory standards. Visible light transmission may be less than 70% in the area of the windshield that is above what is known as the AS1 line which is the upper limit of the driver field of vision. Every windshield is required to have the letters AS1 printed in the appropriate location on the windshield designating the start of this imaginary line. This AS1 portion of the windshield is often provided with a tinted portion known as a sunshade 20. The sunshade, as the name implies, is intended to shade the occupants from the rays of the sun. The sunshade 20 is produced by introducing a dye into the extruded plastic interlayer. The quantity and type of dye determines how effective the sunshade will be with regards to blocking the sun. Sunshades 20 with a visible light transmission of as low as 2% are known though 20% is more typical.

The sunshade 20 is not compatible with camera systems which require as much light as possible. Therefore, on some windshields that require camera systems, the sunshade must be eliminated or provided for by means other than the extruded plastic interlayer product which is typically and economically used. Some alternatives include but are not limited to a printed pattern on: the glass, the plastic interlayer or a performance film and mechanical sunshades or visors. By removing a portion of standard tinted sunshade in the camera field of view and replacing with a transparent laminating resin, this problem is also overcome.

The different types of glass that may be used in the present invention and include but are not limited to: the common soda-lime variety typical of automotive glazing, building windows and containers as well as aluminosilicate, lithium aluminosilicate, borosilicate, glass ceramics, and the various other inorganic solid amorphous compositions which undergo a glass transition and are classified as glass. The glass layers of the present invention may also be comprised of additional compositions or coatings. Some of these compositions may be heat absorbing and/or aesthetic glass compositions as well as glass with different types of coatings, such as infra-red reflecting, anti-glare and anti-reflective coatings among others. Coatings may be applied to any of the glass surfaces.

Infrared reflecting coatings include but are not limited to the various metal/dielectric layered coatings applied though MSVD (magnetron sputtered vacuum deposition) as well as others known in the art that are applied via pyrolytic, spray, CVD (chemical vapor deposition), dip and other methods.

Infrared reflecting films include both metallic coated substrates as well as organic based optical films which reflect in the infrared. Lamination of films requires the addition of an additional plastic bonding layer use to bond the opposite faces of the film to the opposite faces of the glass layers.

The glass layers may be annealed or strengthened. Generally, there are two processes that can be used to strengthen glass. They are thermal strengthening (toughening or tempering), in which the hot glass is rapidly cooled (quenched) and chemical tempering which achieves the same effect through an ion exchange chemical treatment. In the chemical tempering process, ions in and near the outside surface of the glass are exchanged with ions that are larger. This ion exchange process places the outer layer of glass in compression. Compressive strengths of up to 1,000 Mpa are possible.

The use of thin glass layers has been found to improve resistance to breakage from impact such as from stone chips. The thinner glass is more flexible and absorbs the energy of the impact by deflecting and then bouncing back rather than breaking as is the case with a thicker stiffer layer of glass. Also, embodiments comprising a borosilicate exterior layer are substantially more resistant to impact than soda lime glass due to the nature of the composition. Embodiments comprising a chemically tempered layer will also exhibit superior resistance to impact as compared to ordinary soda-lime glass due to the high surface compression of such glasses.

In the embodiment shown in the FIGS. 2-7, the present invention comprises a laminate having two glass layers 201, 202 with each having opposing major faces bonded together permanently by at least one plastic bonding layer 4. The plastic bonding layer 4 may have at least one cutout 8 in different areas where different elements can be mounted, for instance, a cutout 8 can be located at the area where at least one camera can be mounted. The camera location may be in the top center area of the windshield, the typical location on standard windshields. Other locations on the windshield may be used.

A subsequent step of the method, is to provide a cutout 8 in the portion of the plastic bonding layer 4, extending to the edge of glass, is cutout 8 in the camera field of view area of the windshield. The widest horizontal portion is at the edge of the glasses 201 and 202. In other embodiments, the cutout may be entirely inboard of the edge of glass.

The next step of the method is to place an insert 14 to fit into the cutout 8 of the plastic bonding layer 4. Sufficient clearance must be allocated to allow for the alignment between the insert 14 and the cutout 8 taking into account the tolerance stack. In the embodiments shown, there is a 0.5 mm gap between the insert 14 and the edge of the cutout 8 in the plastic bonding layer 4.

The insert 14 can be fabricated from any suitable material that can provide the strength and temperature resistance needed. The material selection will at least partly depend upon the shape of the glass. The insert 14 must prevent compression of the glass plies during the lamination process while being sufficiently flexible to facilitate and allow for removal of the insert 14 after lamination. The material must also not mark or damage the glass surface. Some of the materials which have been found to be suitable include but are not limited to: silicone rubber, Teflon® and nylon.

The following step is to laminate the glazing. During the assembly of the laminate, the insert 14 is placed between the glass layers 201, 202 and aligned with the cutout 8 in the plastic bonding layer 4. An autoclave is used to apply heat and pressure to an assembled laminate to complete the lamination process.

Figure 4A:
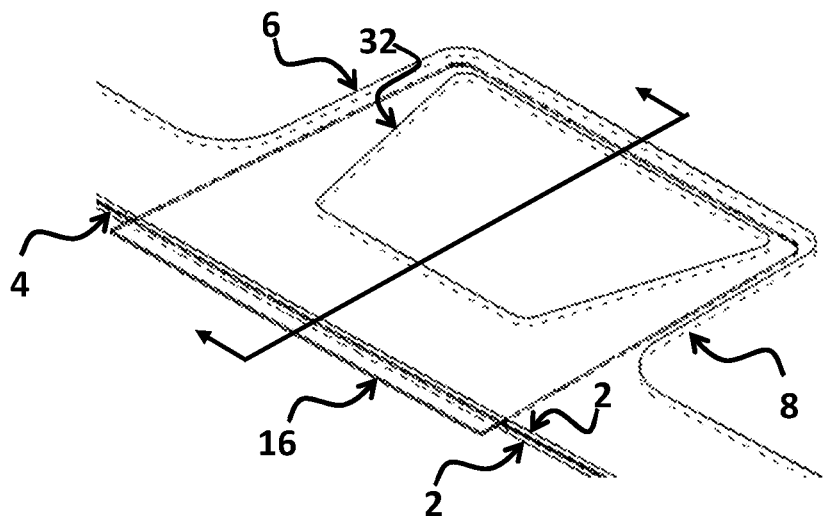
FIG. 4A View of camera optics with insert according to a first embodiment.
Figure 4B:
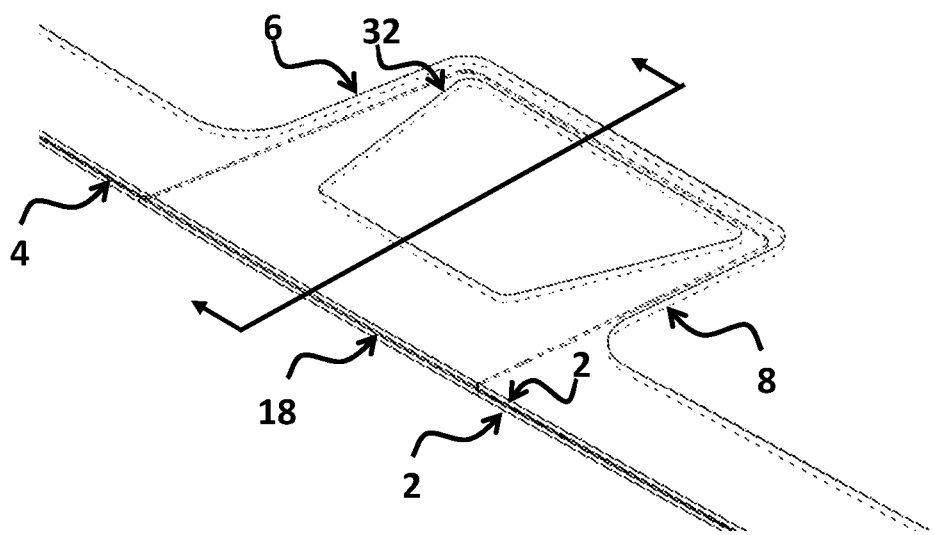
FIG. 4B View of camera optics with insert removed according to a first embodiment.
Figure 5A:
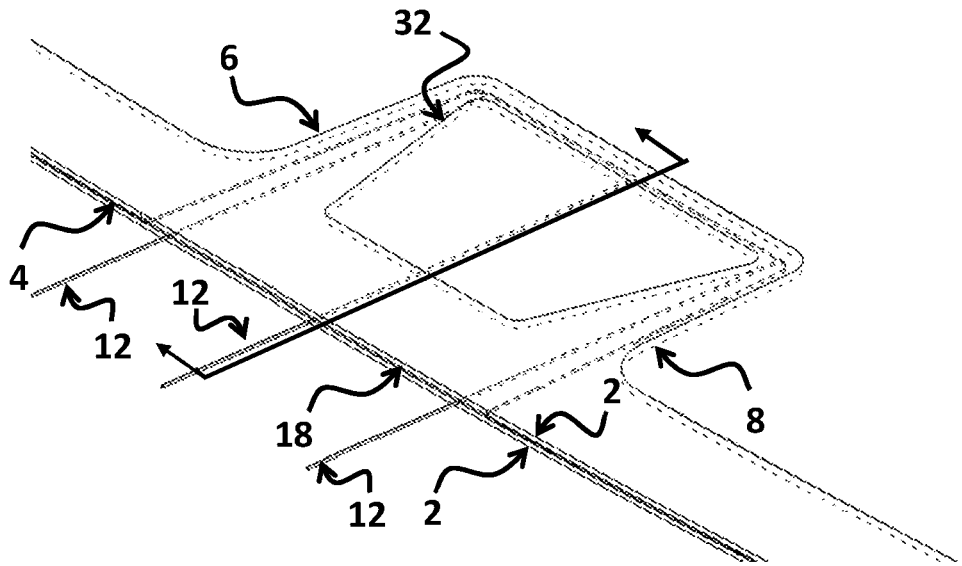
FIG. 5A View of camera optics with filling tubes inserted according to a first embodiment.
Figure 5B:
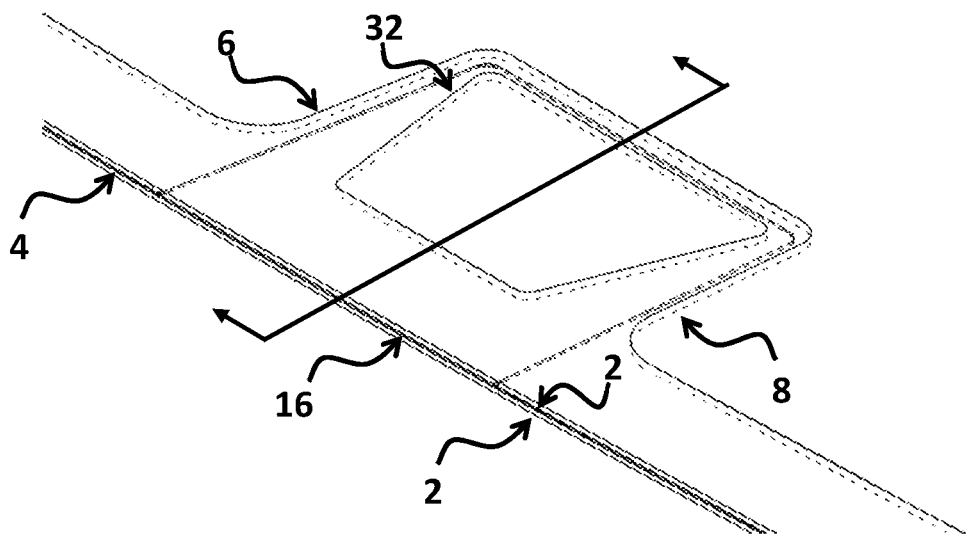
FIG. 5B View of camera optics with laminating resin in place according to a first embodiment.
Figure 7A:
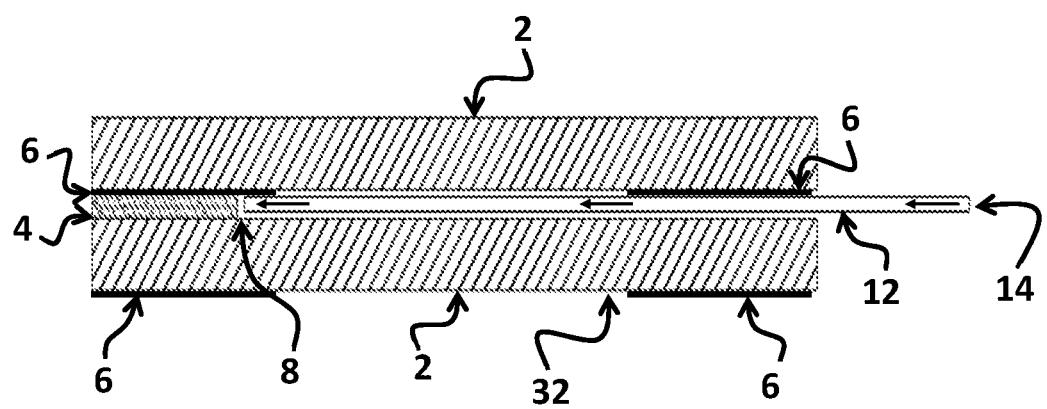
FIG. 7A Cross section of camera optics with filling tubes inserted according to a first embodiment.
Figure 7B:
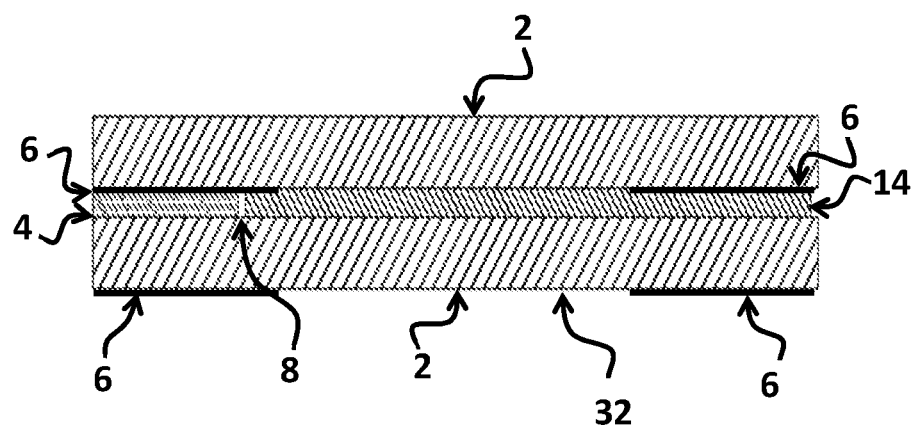
FIG. 7B Cross section of camera optics with laminating resin in place according to a first embodiment.

After lamination, the following step is to remove the insert 14 from the laminate, leaving a void 18 in its place, as shown in FIG. 4B. The following step is to fill the void 18 with a transparent laminating resin. Methods used to produce injection molded plastic parts are well known in the art and any suitable method can be used to fill the void 18 with a transparent laminating resin 16 as shown in FIG. 7. Many such resins are known and commercially available. One with an index of refraction matched to glass that can be UV cured is preferred. The manner in which the resin 16 can be introduced is exemplified. Here, the filling is performed using fill tube needles 12 of 0.5 mm diameter, which corresponds to the distance between the surfaces involved. As discussed, any number of methods may be used to fill the void 18 without departing from the intent of the invention.

In embodiments wherein the cutout 8 is close to the edge of glass it may be convenient to have an insert 14 that is the same width or wider than the cutout 8 so as to allow for easy removal of the insert from the laminate after the lamination process has been completed (FIGS. 2-7). However, in some embodiments (as that shown in FIGS. 8-17), in particular panoramic windshields in which the top edge of the windshield is extended further into the roof line, a wide area insert may not be desired or possible. In addition, an irregular, rounded or trapezoid shape may be needed in which case, removal of an irregular, rounded or trapezoid shaped insert would be difficult or impossible.

Figure 14:
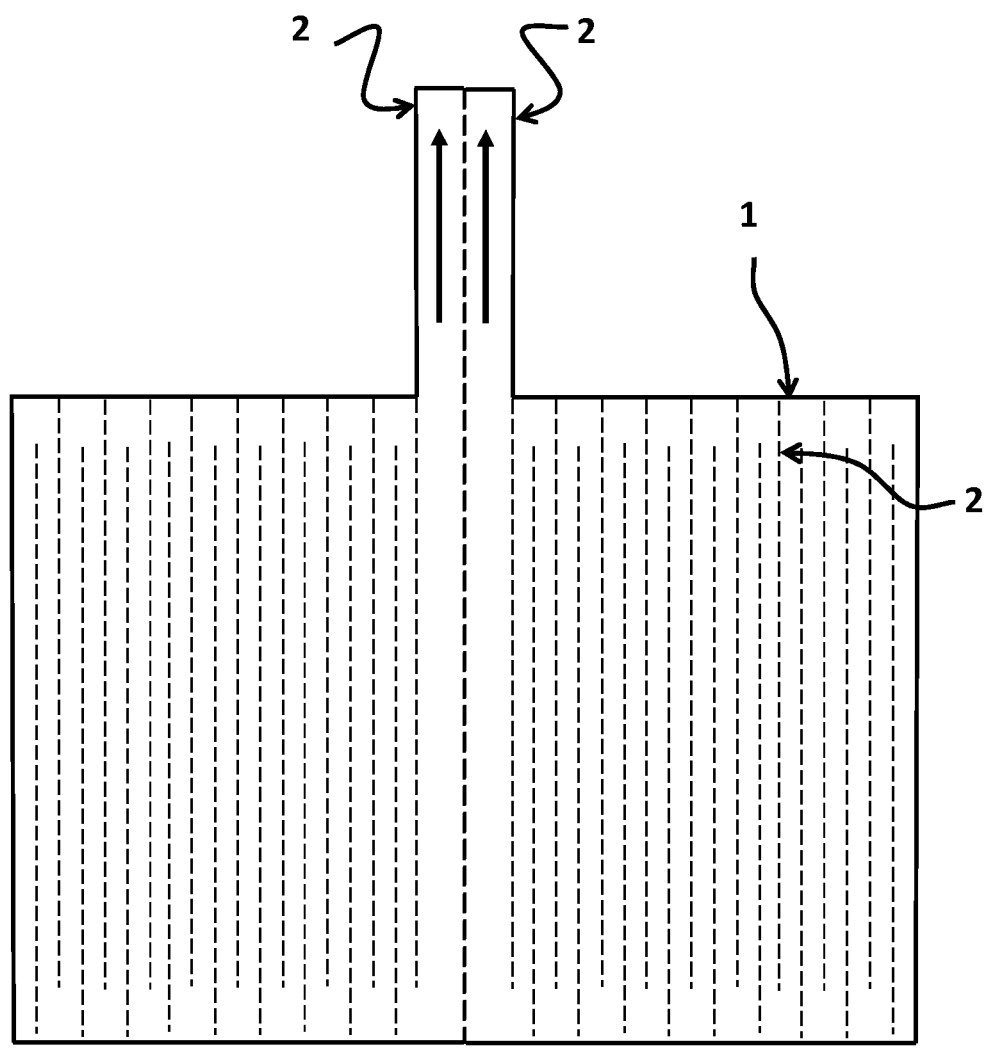
FIG. 14 Insert with perforations according to a second embodiment.

In the embodiment shown in FIGS. 8-17, the insert 14 of the invention is designed such that it can be pulled apart during removal by pulling on one or more tabs 28 extending outboard and beyond the edge of glass. The tab 28 portion of the insert 14 can be accessed from the exterior of the laminate. In the exemplary embodiments, the tab 28 of the insert 14 is designed to extend beyond the edge of glass by at least 6 mm and to have a width of less than 25 mm. The insert 14 shown in FIG. 14 is fabricated from a sheet of 0.76 silicon rubber. Perforations 20 are made in the vertical direction that are just sufficient to hold the insert 14 together during handling and assembly of the laminate. The perforations 20 are spaced approximately 6 mm apart.

Upon the application of force to the insert, the material of the insert perforations 20 will break allowing further deformation of the insert 14.

The perforations 20 themselves may be formed with a perforation width such as that they would be considered slots. The insert 14 may have gaps, voids, slots or other shapes depending upon the glass thickness, the autoclave and processing parameters, the insert material and the insert 14 design. The key is to have an area of unsupported glass of less than that which allow for an excess degree of deformation of the glass itself to take place and the accompanying increase in the level of stress in the glass and in the probability of breakage. Such gaps, rather than just perforations of minimal width, can facilitate removal of the insert by providing for increased clearance inside of the laminate.

The material selected for the insert 14 as well as the thickness of the material will determine the length of each perforation and the spacing. The perforations 20 may take the form of a series of small circles of dots as would be the case if a LASER were to be used to create the perforations as is commonly done with paper documents which are required to have a portion that is easily separated.

The perforation can be created through a variety of methods known in the art, as appropriate for the material selected. They may be die cut, LASER cut, blade cut, molded or otherwise formed. If the material has sufficient stiffness such that it can be readily handled and worked with during assembly, the perforations may not be needed at all as illustrated in FIG. 15.

A subsequent step of the method, is to laminate the glass layers and plastic layers. After lamination, the insert 14 is removed in two separate sections by pulling on each of the two tabs 28 extended from the edge of glass. As the tabs 28 are placed in tension, the rubber stretches and the perforations 20 tear allowing the segments to unfold and further separate. Each tab 28 may have different thicknesses, the embodiment illustrated has a width of approximately 12 mm so that the segments can be easily pulled through the gap 18.

Figure 15:
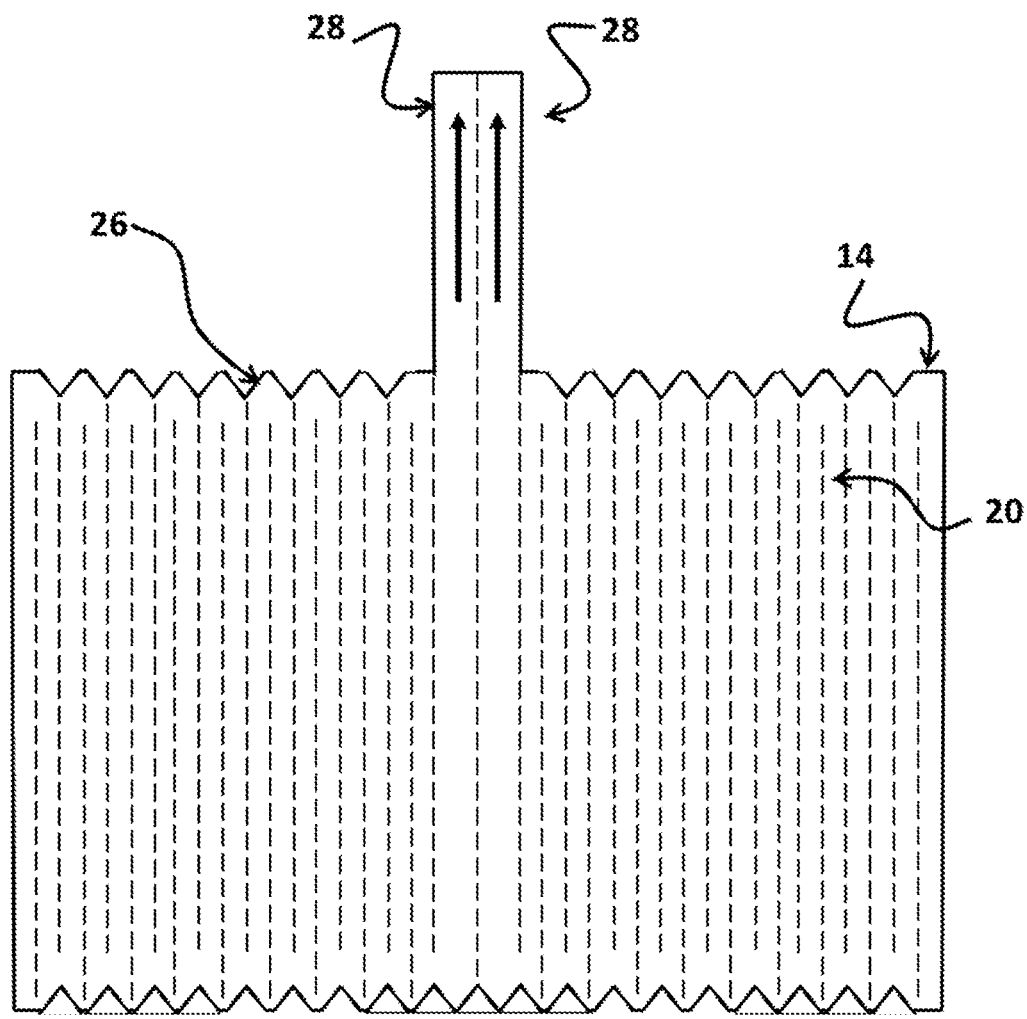
FIG. 15 Insert with perforations and notches according to a second embodiment.

FIG. 15 shows the insert of FIG. 14 further comprising additional cuts or notches 26 made to prevent binding of the insert during removal. A wedge shape is shown but as can be appreciated, other shapes may be just as effective or even more. The wedge of the exemplary embodiment allows the insert 14 to more easily bend.

Figure 16:
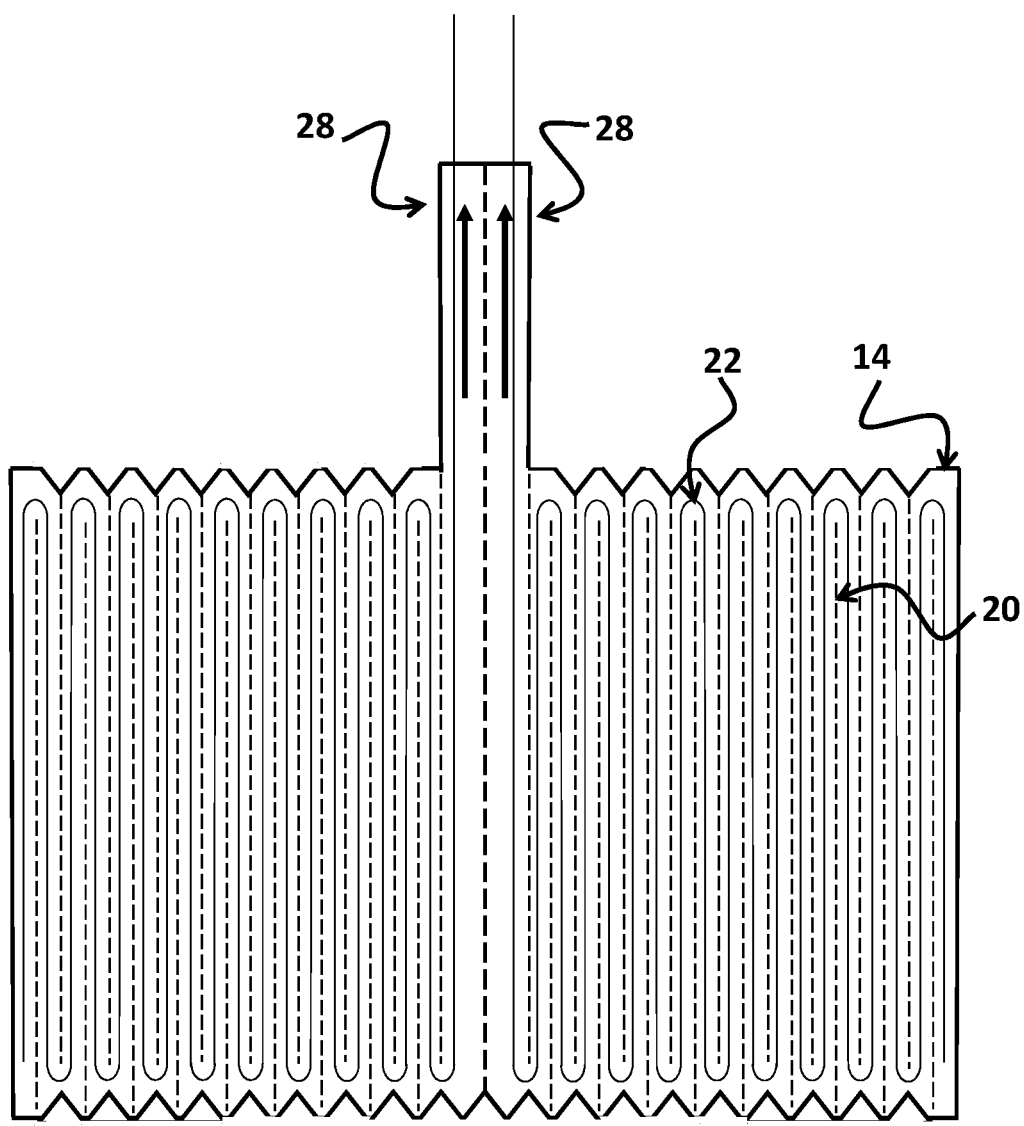
FIG. 16 Insert with perforations, notches and wire reinforcement according to a second embodiment.

In some instances, where the insert 14 must be removed through a very narrow opening and or over a greater distance, greater force may be required to remove the insert 14. FIG. 16 shows the insert of FIG. 15 with a thin high tensile strength wire reinforcement 22 embedded in the plastic of the insert 14. The wire is sized such as to be able to withstand the maximum force required to remove the insert 14 from the laminate. This may also be used to allow for a more rapid removal rate as well. A 100 μm or greater solid Tungsten wire has been found to work well.

Figure 17:
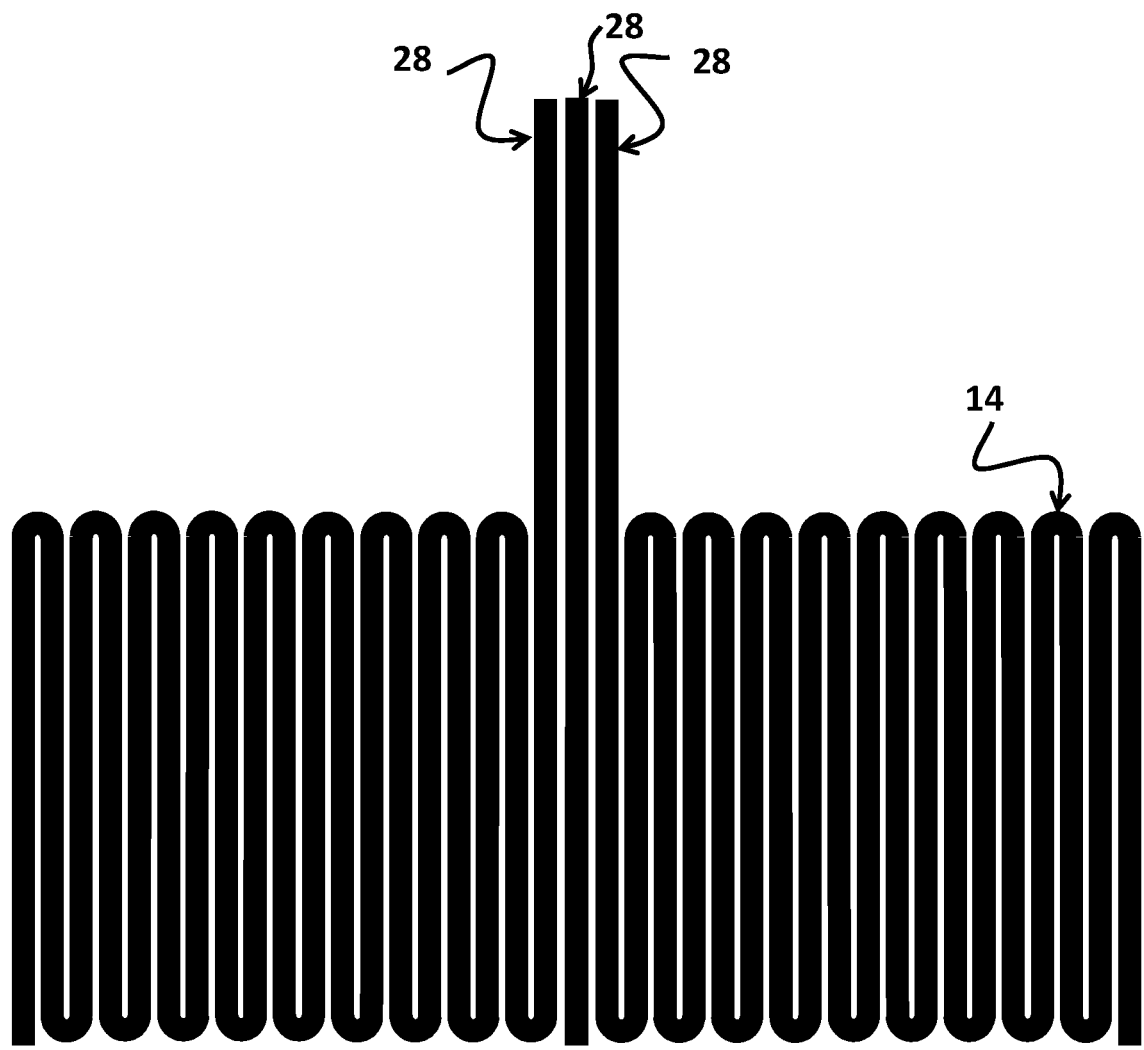
FIG. 17 Formed insert according to a second embodiment.
Figure 18B:
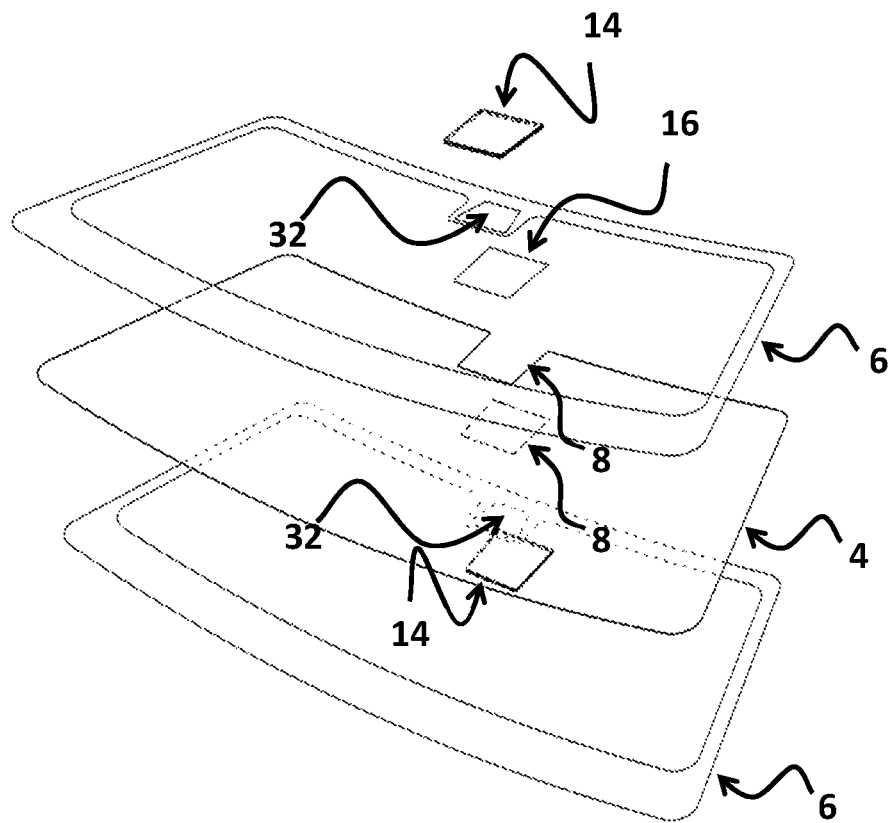
FIG. 18B Isometric View of Laminate with Plate according to a third embodiment.
Figure 18A:
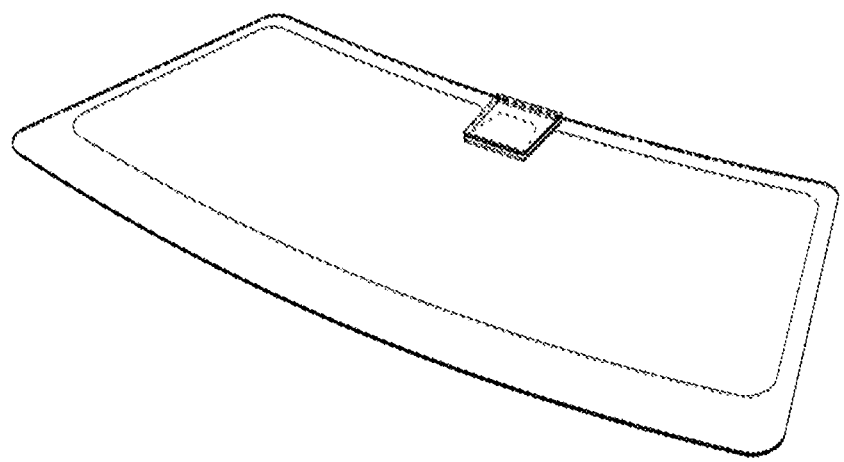
FIG. 18A Exploded view of Laminate with Plate according to a third embodiment.
Figure 19:
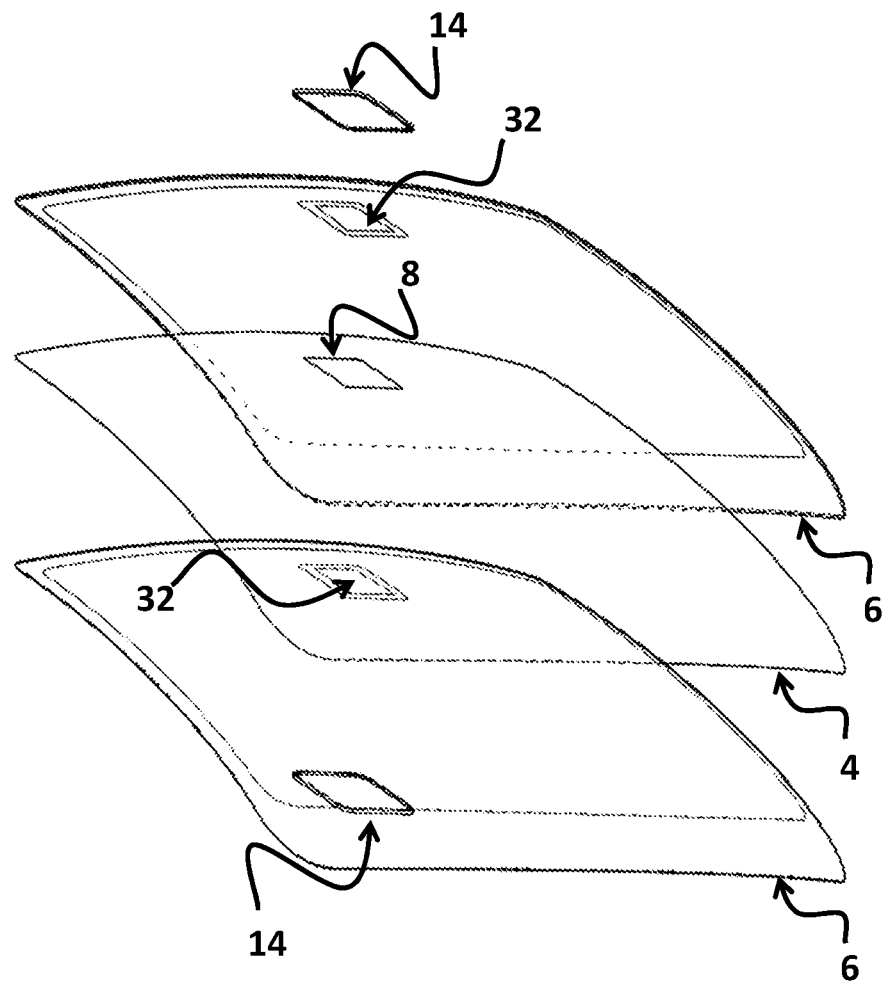
FIG. 19 Exploded view of Laminate with Plate according to a third embodiment.
Figure 20:
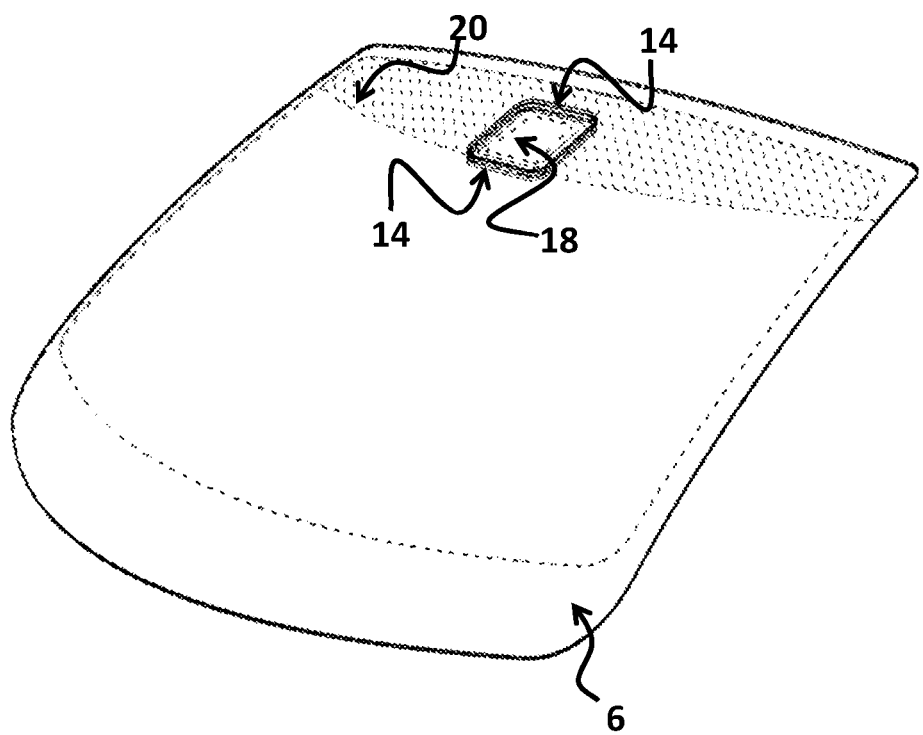
FIG. 20 Isometric View of Laminate with Plate according to a third embodiment.
Figure 21:
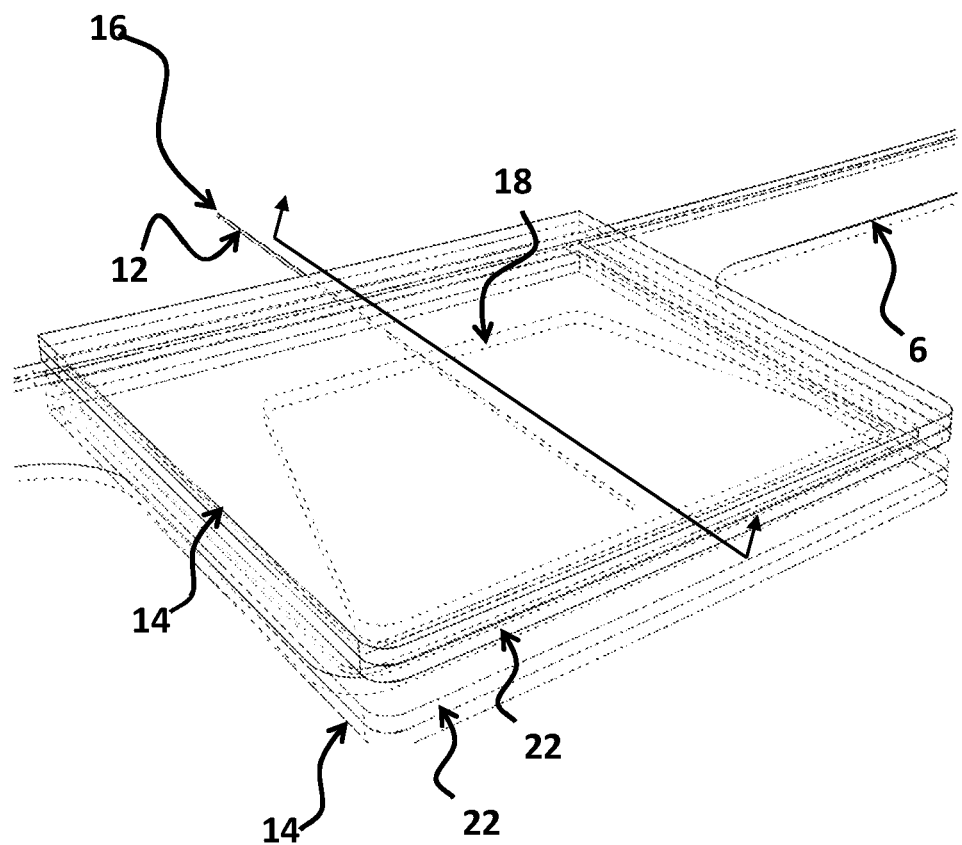
FIG. 21 Detail view of Plate according to a third embodiment.
Figure 23A:
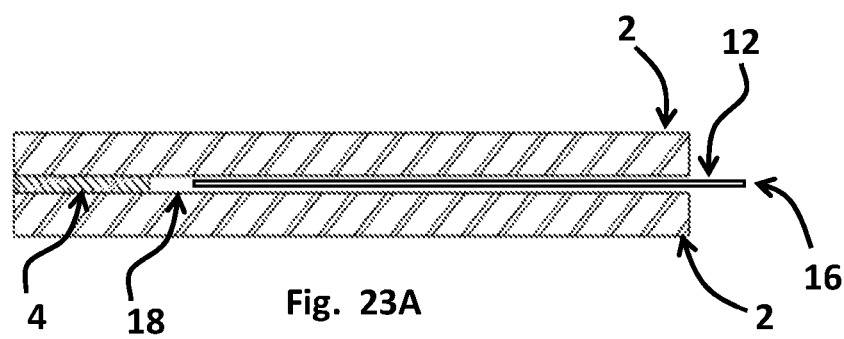
FIG. 23A Cross Section showing fill from edge of glass with tube.
Figure 23B:
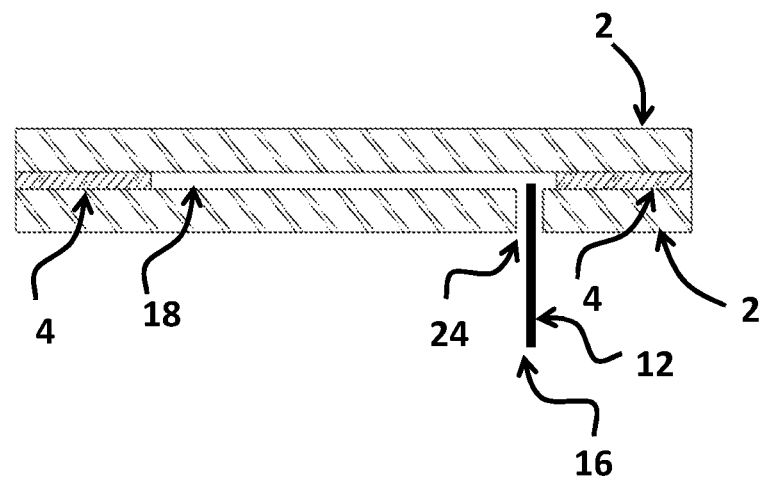
FIG. 23B Cross Section showing fill through hole in glass with tube according to a fourth embodiment.

FIG. 17 shows an alternate embodiment of the insert 14. In this example, the insert 14 is formed though injection molding, vacuum molding or any other forming method known in the art suitable for the material chosen. In the exemplary embodiment illustrated, a single center tab 28 is provided, which is first removed, facilitating the removal of the remaining two segments. The simpler and more uniform cross section allows for easier deformation of the insert 14. The gaps are limited by the thickness and the strength of the glass as well as the maximum force to be applied and the duration of the lamination process cycle.

The following step is to laminate the glazing. During the assembly of the laminate, the insert 14 is placed between the glass layers 201, 202 and aligned with the cutout 8 in the plastic bonding layer 4. An autoclave is used to apply heat and pressure to an assembled laminate to complete the lamination process.

After lamination, the following step is to remove the insert 14 from the laminate, leaving a void 18 in its place. The following step is to fill the void 18 with a transparent laminating resin. Methods used to produce injection molded plastic parts are well known in the art and any suitable method can be used to fill the void 18 with a transparent laminating resin 16 as shown in FIG. 7. Many such resins are known and commercially available. One with an index of refraction matched to glass that can be UV cured is preferred. The manner in which the resin 16 can be introduced is exemplified. Here, the filling is performed using fill tube needles 12 of 0.5 mm diameter, which is less than the distance between the surfaces involved. As discussed, any number of methods may be used to fill the void 18 without departing from the intent of the invention.

Figure 25:
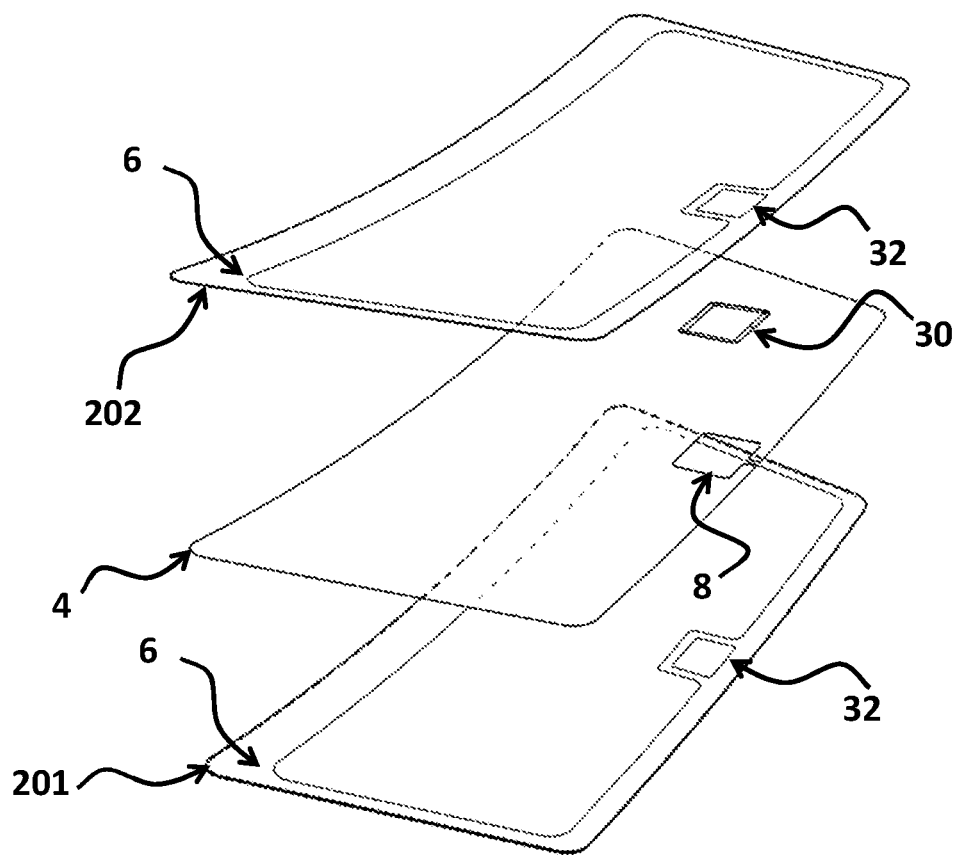
FIG. 25 Exploded view of laminate with tapered insert according to a sixth embodiment.
Figure 26:
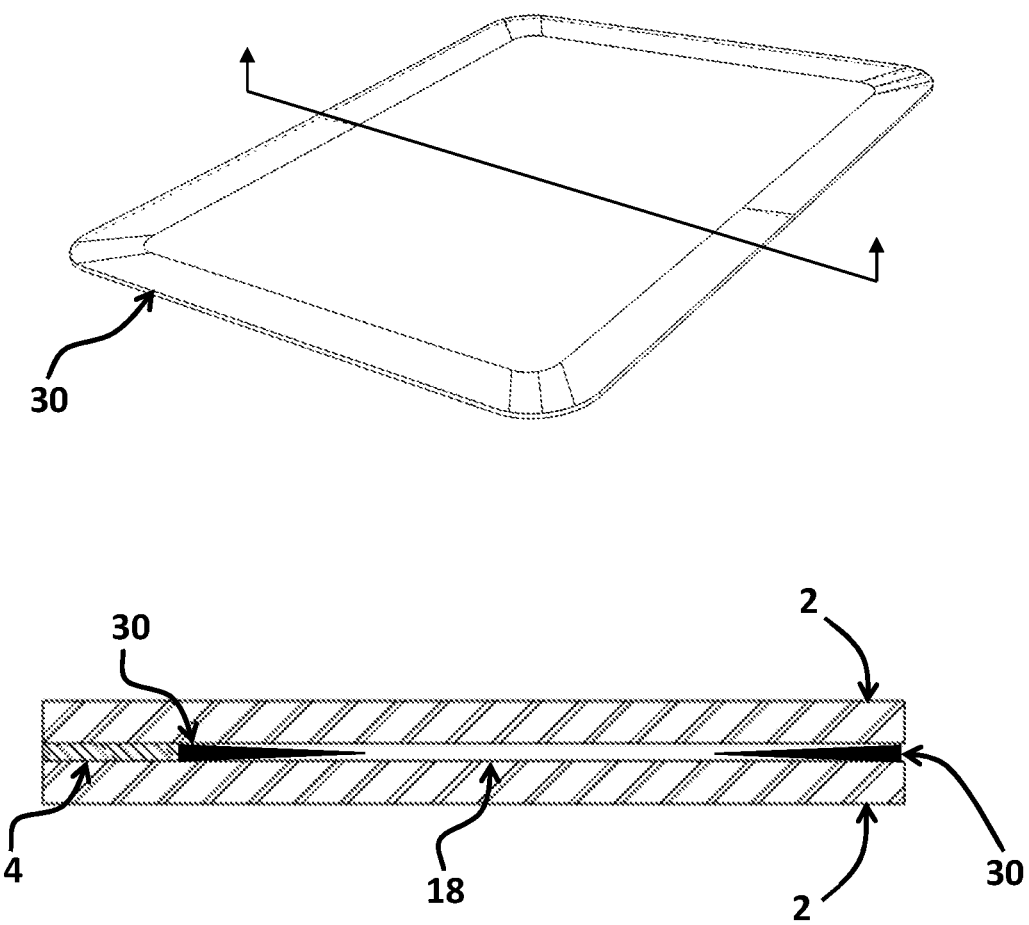
FIG. 26 Cross section of tapered insert according to a six embodiment.

In another embodiment (FIGS. 25-26), the breakage of the void area during lamination is prevented through the introduction of a tapered insert 30 within the cutout area. The cutout size may need to be increased to prevent the insert 30 from encroaching upon the camera field of view as the insert will become a permanent part of the windshield. Breakage during the lamination process is the result of an abrupt change in the thickness of the interlayer. Through the use of a tapered insert 30 the rate of change in the thickness is kept below the rate that will result in breakage. The rate of change is determined by the type of glass, the plastic bonding layer thickness, the thickness of the glass layers 2 and the autoclave cycle. Some experimentation may be required to obtain an optimum value. While a triangular shape is shown in the exemplary embodiments, the only requirement is that the insert 30 be of a thickness that is about the same as the plastic layer at the starting point and that the thickness at the furthest inboard portion of the insert 30 be thin enough to not induce stress in the glass that is high enough to break the glass 2. In the exemplary embodiments, the insert is of a triangular tapered shape, staring out at about 0.76 mm and approaching zero at the inner most edge. The width of the insert is ~18 mm.

In an alternative embodiment, which is depicted in FIGS. 18-22, after the step of providing a cutout 8 in the portion of the plastic bonding layer 4, a set of plates 14 is placed to cover the glass layer on each side of the cutout 8 in the plastic bonding layer 4. The plates 14 are used to prevent breakage of the glass but distributing the forces applied to the glass during the laminate process to areas that have the strength to withstand them.

Glass is laminated by first removing any air from the assembled set of glass and plastic layers. Next heat and pressure are used to permanently bond the assembly forming a laminate. Any abrupt change in the thickness of the interlayer can result in breakage due to the high vacuum and pressure applied to the assembly. The plastic interlayer acts as a fulcrum multiplying the force. While glass has very high compressive strength, it is a brittle material that will yield under relatively low tensile stress. The plate 14 serves to distribute force applied and transfer it to the portions of the glass surface that are fully supported by the plastic interlayer.

The plate 14 must be larger than the cutout and completely cover the cutout so as to transfer and distribute the force applied during lamination to the portions of the glass surface that are supported by the interlayer. In the embodiments shown, the plate 14 is 12 mm larger on each side than the cutout 8. The plate must also be able to form a seal with the glass surface by means of an o-ring, gasket or other sealing means 22. The plate can be held in place during lamination by any convenient means including but not limited to tape, adhesive, clips or clamps.

The plate 14 can be fabricated from any suitable material that can provide the strength and temperature resistance needed. The plate 14 must prevent compression of the portions of the glass not supported by the plastic bonding layer 4 during the lamination process. Some of the materials which have been found to be suitable include but are not limited to: aluminum, steel and carbon fiber.

The means of fabrication of the plate 14 will depend upon the shape of the glass thickness, composition, the glass surface curvature, the lamination parameters and the material selected for the plate. Fabricating means include but are not limited to: machining, molding, bending, and casting.

The plate 14 must be provided with a sealing means 22. In some of the embodiments, a slot is cut in the plate into which a 3 mm diameter O-ring 22 is placed. In other embodiments, the surface of the plate is covered in a soft compressible low durometer silicon rubber. The seal also serves to prevent marking or damage of the glass surface from the plate and to allow for mismatch between the plate and the glass surface. For laminated windshields, a tolerance of +/−1.5 mm is typical for the glass surface.

The cutout 8 may extend to the edge of glass in which case the plate must also extend to at least the edge of glass. The two plates 14 may be mechanically joined through any convenient joining means to increase the overall strength of the plate assembly.

The next step is to laminate the glazing. During the assembly of the laminate, a plate 14 is placed on each of the glass layers 2 and aligned with the cutout 8 in the plastic bonding layer 4. Air is evacuated from the assembly. An autoclave is then used to apply heat and pressure to an assembled laminate to complete the lamination process.

After lamination, the next step is removing the plates 14 from the laminate.

The next step is filling the void 18 with a transparent laminating resin. Methods used to produce injection molded plastic parts are well known in the art and any suitable method can be used to fill the void 18 with a transparent laminating resin. Many such resins are known and commercially available. One with an index of refraction matched to glass that can be UV cured is preferred.

The manner in which the resin 16 can be introduced is exemplified. The void in the plastic layer extends to the edge of glass providing for ready access to the void. The filling is performed using a fill tube needle 12 of 0.5 mm diameter to inject the resin, which is less than the distance between the surfaces involved. As discussed, any number of methods may be used to fill the void 18 without departing from the intent of the invention.

If the void does not extend to the edge of glass, a means must be provided to introduce the resin into and fill the void.

Figure 24:
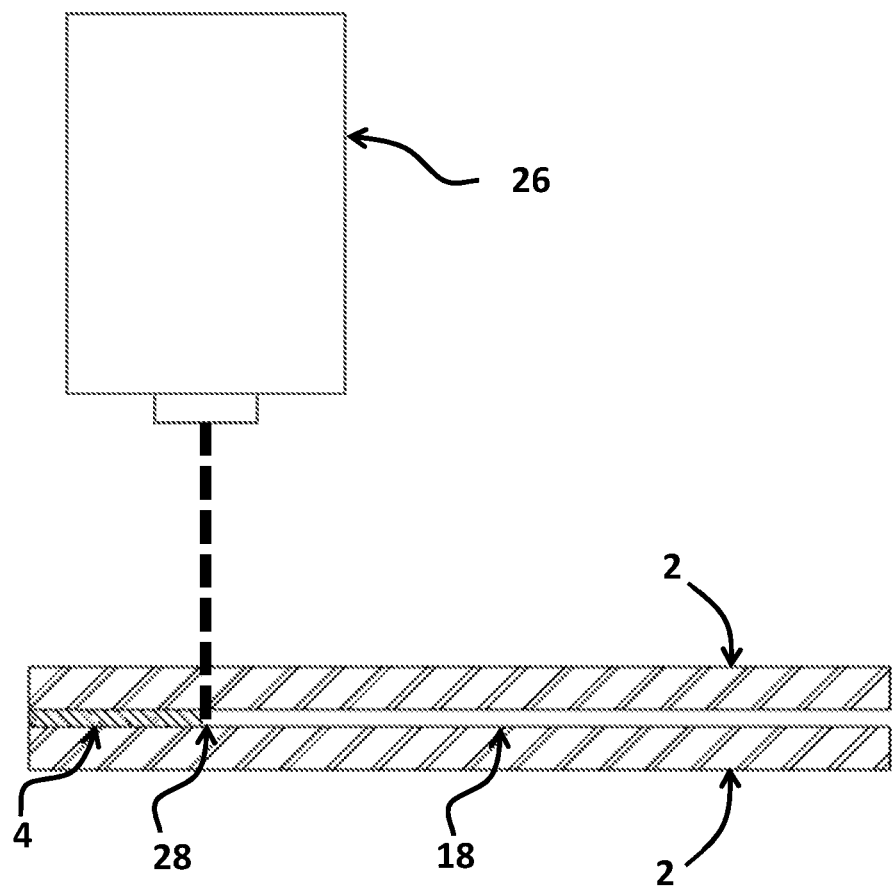
FIG. 24 Cross Section showing LASER ablation of PVB according to a fifth embodiment.

In one embodiment, a LASER 26 (FIG. 24) is used to cut an opening through the inner glass layer in an area outside of the camera field of view. Methods of LASER 26 cutting and drilling through glass are known in the art. A nano second pulsed LASER 26 or preferably a femto second pulsed LASER 26 is used in conjunction with an optical means with provides a focal point that is at or below the exterior surface of the glass. As the glass is removed by the LASER 26 the focus is adjusted or the LASER 26 itself is moved to deepen the opening. In this manner, holes 24 with low surface roughness can be produced. Surface roughness is important as it is a measure of the quality of the glass surface. A smoother surface has fewer and less severe surface defects. A smoother surface has a lower probability of breakage.

One of the main problems with annealed glass that has holes 24 drilled through the glass is that the holes 24 tend to create weak spots which act as stress concentrators which can lead to breakage. This is because holes 24 in glass are typically made by grinding rather than traditional material removal methods that are used with metals and plastics. This is because glass is a brittle material. While it exhibits almost perfect elastic behavior it does not undergo plastic deformation under stress. Under stress, glass will bend but not deform unless it is pushed to the point of failure. Prior to that point, the glass will flex back to its original shape when the force is removed. As a result, it cannot be cut, drilled or otherwise worked by the same methods that are used for plastics, wood and metals. The glass will shatter. Holes 24 need to be made by grinding away the glass. In addition, it is desirable to use two drill/grinding bits that meet in the middle of the glass thickness to avoid chipping that occurs when a single drill/grinding bit emerges through the opposite side. This dual bit method also contributes defects at the surface and in the walls of the hole 24 which can lead also to breakage.

One of the other problems caused by holes 24 in annealed glass is caused by a phenomenon known as slow crack growth. The cutting and grinding process leave behind surface defects. These small defects or cracks in the glass surface have a tendency to grow over time due to exposure to moisture. The water reacts with the molecules of the glass composition forcing the cracks to open wider. In this manner, with no impact or added loading, glass has a tendency to fail if left exposed to moisture long enough.

In the method of the invention, the holes 24 are made using a LASER 26 after bending and annealing of the laminate has been accomplished. The low surface roughness (<5 um) makes for an exceptionally strong and uniform edge. With the LASER 26 it is also possible to quickly make very small holes 24 (<6 mm diameter) which are not physically or economically possible using conventional methods. The LASER 26 fill hole 24 can be as small as 1 mm or even less in diameter.

To eliminate small crack growth from the hole 24, once the resin has been injected into the void, the hole 24 is filled with resin as well. In this manner, the microscopic defects of the hole 24 are filled, protecting the glass from moisture and preventing any added risk of breakage. This is the same principle that the process as used to repair damaged windshields is based upon.

While the preferred method of using a LASER 26 to produce the opening in the glass the method of the invention can also be practiced by conventional methods of producing holes 24 in glass as already described.

While the preferred method of practicing the invention is to create a hole, but means of a LASER 26 or conventional (grinding) methods, the hole 24 may be produced prior to bending. This has disadvantages that may be offset by the advantages of creating the hole 24 in the flat glass rather than in the curved glass after bending. In this case, the effect on the bending process can at least me somewhat offset by using an insert to temporarily fill the opening during the bending process.

Rather than creating a hole 24 through the glass to fill the void with resin, an alternate method is to use a LASER 26 to remove the plastic interlayer after lamination creating a channel that can be used to introduce the resin and fill the void. The LASER 26 if provided with an optical system that can focus the beam energy to a small spot below the surface of glass. In this manner, the beam is allowed to pass through the glass without damaging the glass. This is similar to the principle used to manufacture small solid transparent blocks having three dimensional images engraved within them and often sold as souvenirs. The plastic is cleanly ablated by the high energy of the focused beam. The path must start at the edge of the glass to allow for venting and then progresses inward to the camera area void. After filing of the void, the channel itself is filed as well with resin. This is especially advantageous when the void is located a substantial distance from the edge of glass where it would be difficult to provide a fill channel in the plastic layer prior to lamination.

The camera area itself can also be formed by LASER 26 ablation of the plastic layer after lamination. One or more vent/fill channels is first created. Then, in the same manner, the reaming plastic is removed by the ablation process.

It should be noted that the forming process of the laminated glazing can be carried out by the standard manufacturing process available in the art. The typical process includes, but it is not limited to, the following steps:

a) cutting the glass to shape;
b) treating the edge of glass;
c) bending the glass by means of gravity or pressing and temperature;
d) optionally strengthening the glass;
e) assembling the internal glass layer, external glass layer and adhesive layer; and
f) laminating the glass layers and plastic layer.

Figure 6A:
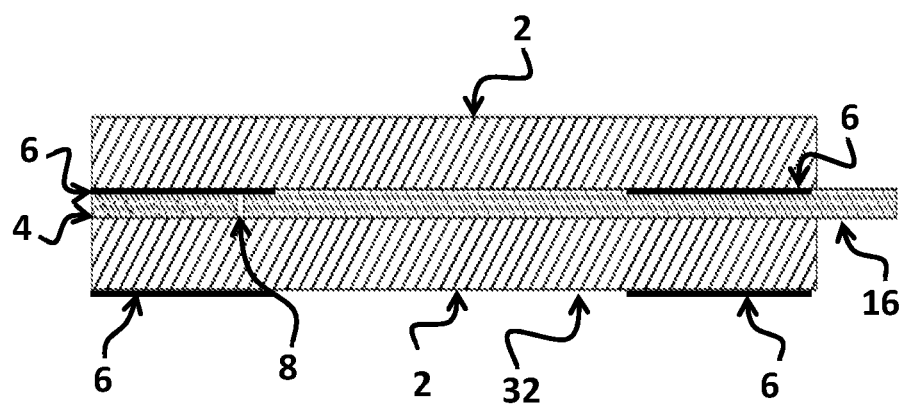
FIG. 6A Cross section of camera optics with insert according to a first embodiment.
Figure 6B:
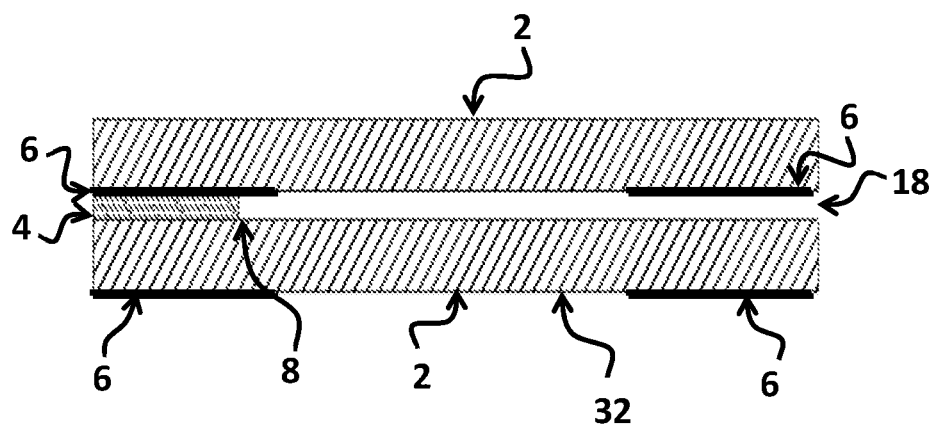
FIG. 6B Cross section of camera optics with insert removed according to a first embodiment.

An optional step is to print the black obscuration 6 on surface two 102 and/or surface four 104 of the glass to hide any parting line delineating the boundary between the injected resin 16 and the bonding layer 4 as shown in FIGS. 6-7.

The glass layers are formed using gravity bending, press bending, cold bending or any other conventional means known in the art. Gravity and press bending methods for forming glass are well known in the art and will not be discussed in the present disclosure.

On parts with minimal curvature at least one glass layer can be formed by cold bending a flat sheet of glass to the contour of the part. Cold bending is a relatively new technology. As the name suggests, the glass is bent, while cold, to its final shape, without the use of heat. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically or heat strengthened the glass is able to endure much higher levels of stress and can be bent along both major axis. The process is primarily used to bend chemically tempered thin glass sheets (<1 mm) to shape.

Cylindrical shapes can be formed with a radius in one direction of greater than 4 meters. Shapes with compound bend, that is that are curved in the direction of both principle axis, can be formed with a radius of curvature in each direction of as small as approximately 8 meters. Of course, much depends upon the surface area of the parts, types of glass and thicknesses of the substrates.

The cold bent glass will remain in tension and tend to distort the shape of the bent layer that it is bonded to. Therefore, the bent layer shape may need to be compensated to offset the tension. For more complex shapes with a high level of curvature, the flat glass may need to be partially thermally bent prior to cold bending.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

In the embodiments shown, the assembly may be formed by bending one of the layers by gravity bending and placing the other glass layer thereon to be cold bent. Along with the plastic bonding layer placed between them, the assembly is placed in what is known as a vacuum bag. The vacuum bag is an airtight set of plastic sheets, enclosing the assembly and bonded together it the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, with the exception of having an unbent glass layer added to the stack of glass.

It should also be noted, as one or ordinary skill in the art can appreciate that the invention can be applied to other laminates and positions in addition to the windshield. The windshield is just the most common location to date and the only position which is required by law to be comprised of laminated safety glass.

Windshield distortion in measured by automated scanning devices and quantified in millidiopters usually as a contour plot of the windshield. Diopters are used to measure the power of a lens. Millidiopters is the reciprocal of its focal length in kilometers. Limits are typically in the range of 100-500 millidiopters depending upon the area of the windshield where the distortion occurs. Using the methods described surprising and unexpected results have been obtained. In one experiment, working with a random sample of bent glass from normal serial production, the maximum distortion in the camera area portion of a standard production windshield was reduced from ~200 millidiopters to under 100 millidiopters. In some of the experiments, the distortion has been reduced to under 50 millidiopters.

DETAILED DESCRIPTION OF THE EMBODIMENTS

A. The windshield has a standard 2.1 mm thick exterior glass layer 201 and interior glass layer 202. Black frit 6 is applied to the surface two and the surface four. The black frit frames the camera viewing area and also served to obscure the boundary between the PVB plastic bonding layer 4 and the resin 16. In the camera field of view area, a cutout 8 made in the 0.76 mm thick PVB plastic bonding layer 4. The cutout 8 has a depth of about 170 mm and a width of about 175 mm with the innermost width 6 mm less than the width at the edge of glass so as to produce a taper. This gives the cutout 8 area a slight draft angle which facilitates removal of the insert after lamination. An insert 14 that is 0.5 mm smaller than the cutout 8 and 6 mm longer so that the insert 14 extends beyond the edge of glass is made from 0.76 mm silicon rubber. The insert 14 should extend outboard of the edge of glass to facilitate removal after lamination. At the same time, the extended portion must not interfere with lamination. An extension of 6 mm allows for the use of vacuum channels to de-air the assembly without modification. After bending, the glass layers 201, 202 are assembled and the insert 14 is placed between the glass layers in the cutout 8. The assembly is then laminated. After lamination, the insert 14 is removed from the laminate, leaving behind a void 18. The laminate is placed in the vertical position and the fill tube 12 needles are inserted into the void. A transparent optical laminating resin 16 is then injected using a precision metering pump, into the void 18. The fill tube needles 12 are withdrawn as the level of the resin 16 rises. Agitation and vacuum may be used, if needed, to remove air. The resin may be cured by means of ultra-violet light.

B. The windshield of embodiment 1 further enhanced by the application of an infra-red reflecting coating to the surface two.

C. The windshield of embodiment 1 further enhanced by the addition of an infra-red reflecting film and a second plastic bonding layer having a thickness of about 0.38 mm. The film is placed between the two bonding layers. The thickness of the insert is correspondingly increased to a 1.15 mm.

D. The windshield of embodiment 1 further enhanced by the use of a sound dampening plastic bonding layer.

E. The windshield of embodiment 1 further enhanced by the use of a heat absorbing plastic bonding layer.

F. The windshield of embodiment 1 further enhanced by an obscuration printed on the plastic bonding layer.

G. The windshield of embodiment 3 further enhanced by an obscuration printed on the plastic film.

Figure 8:
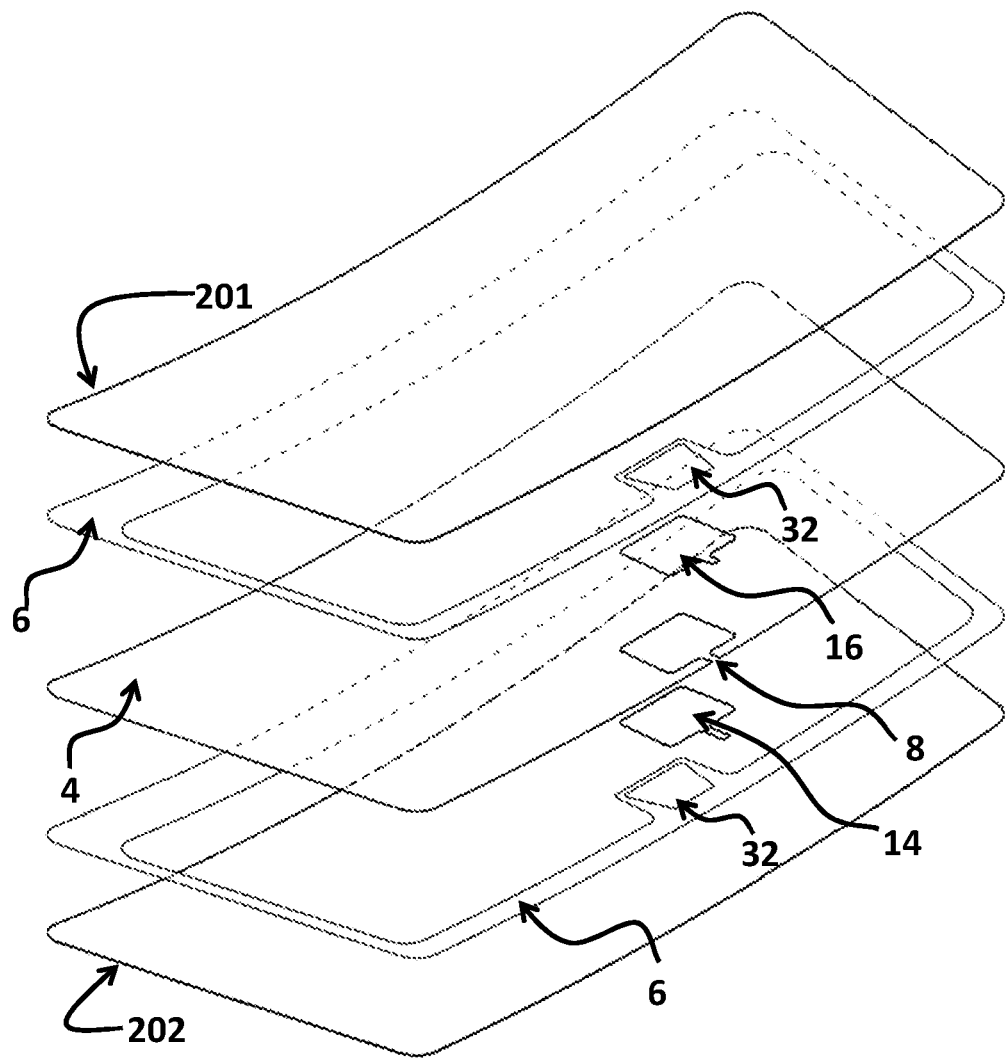
FIG. 8 Exploded view of a laminate according to a second embodiment.
Figure 9A:
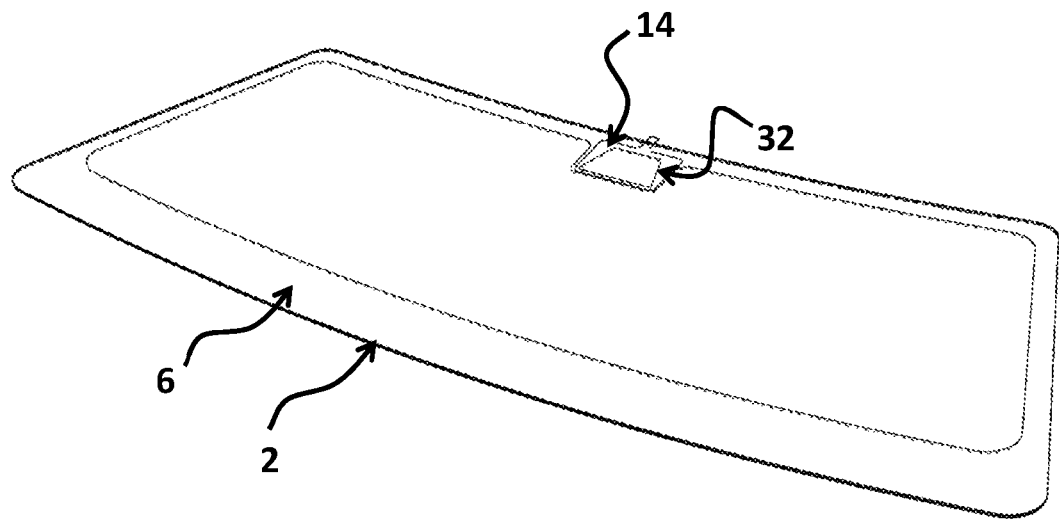
FIG. 9A Isometric view of an embodiment of a windshield according to a second embodiment.
Figure 9B:
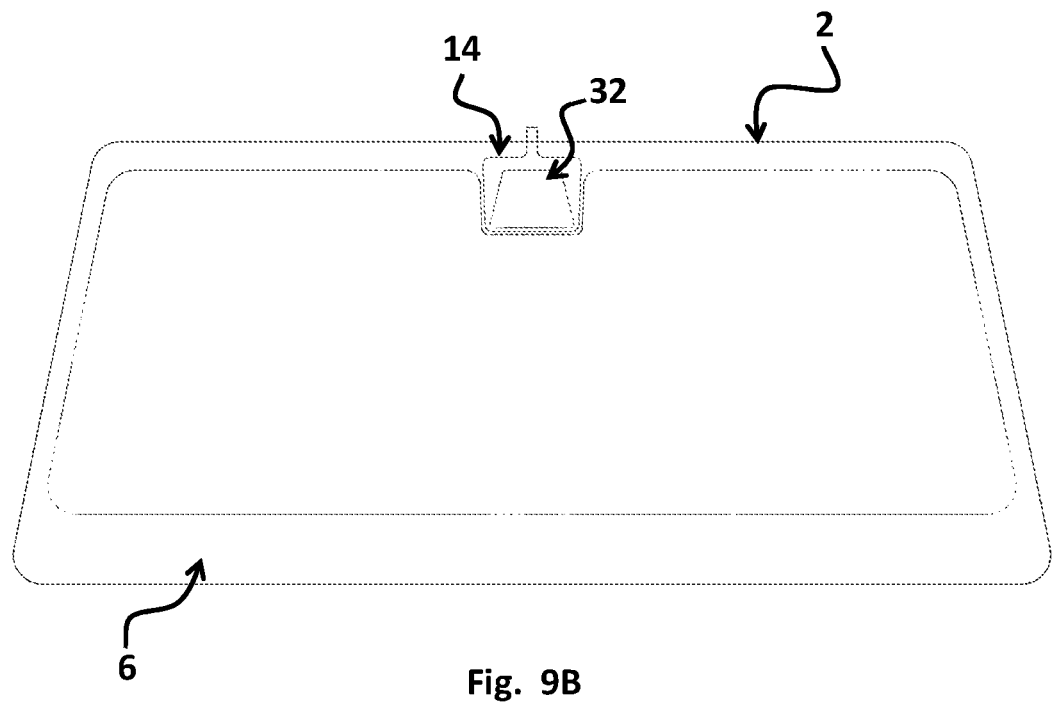
FIG. 9B Front view of an embodiment of a windshield according to a second embodiment.
Figure 10A:
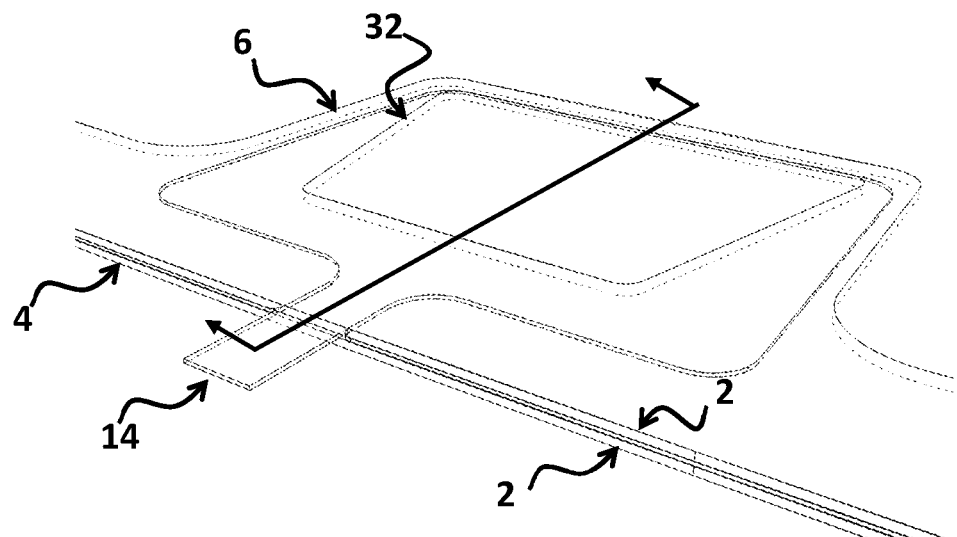
FIG. 10A View of camera optics with insert according to a second embodiment.
Figure 10B:
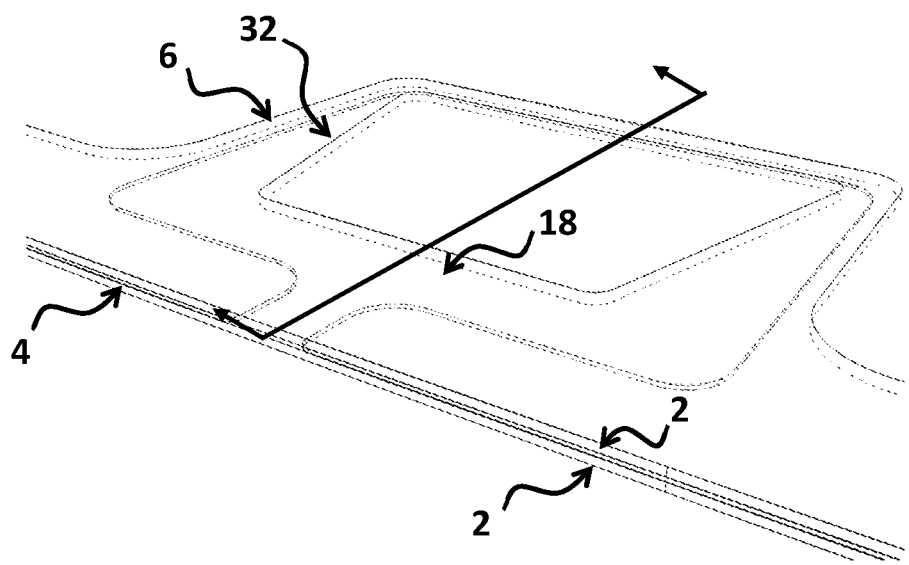
FIG. 10B View of camera optics with insert removed according to a second embodiment.
Figure 11A:
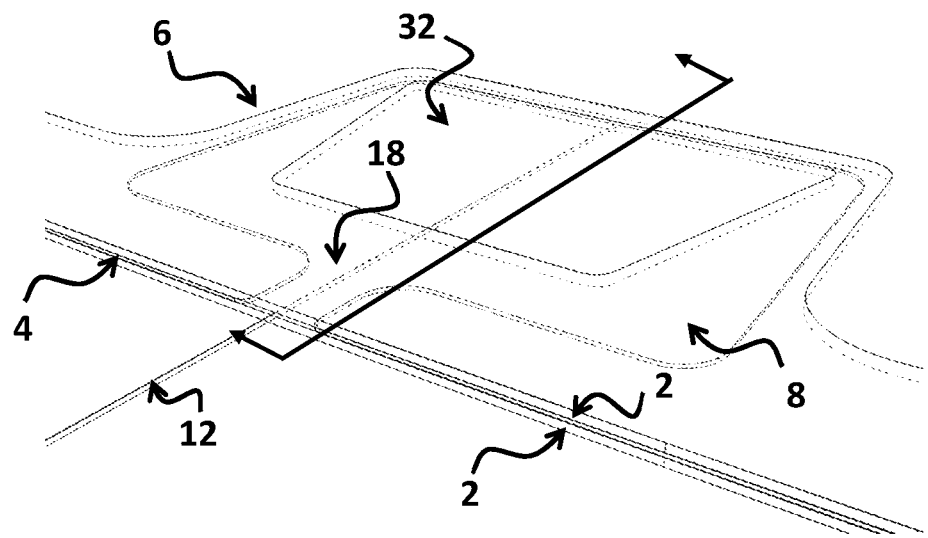
FIG. 11A View of camera optics with filling tubes inserted according to a second embodiment.
Figure 11B:
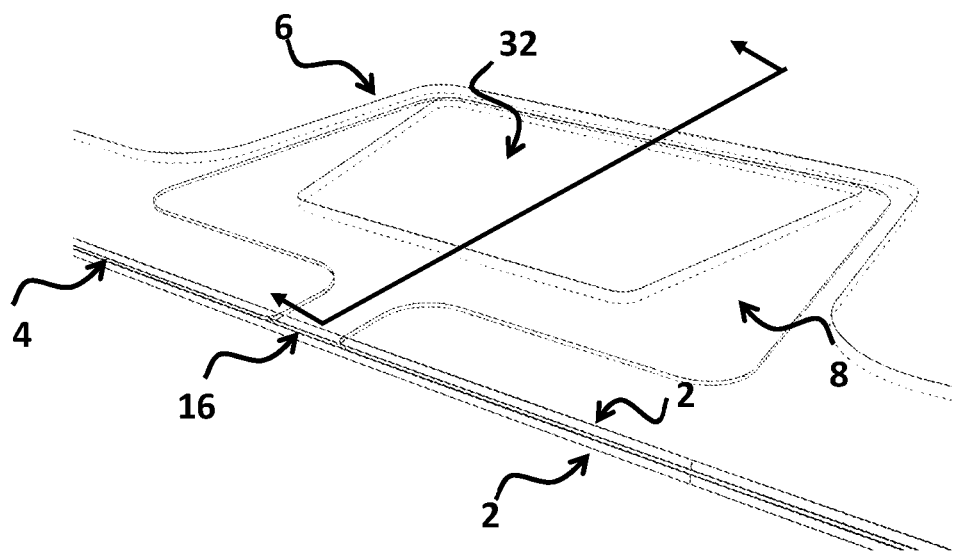
FIG. 11B View of camera optics with laminating resin in place according to a second embodiment.
Figure 12A:
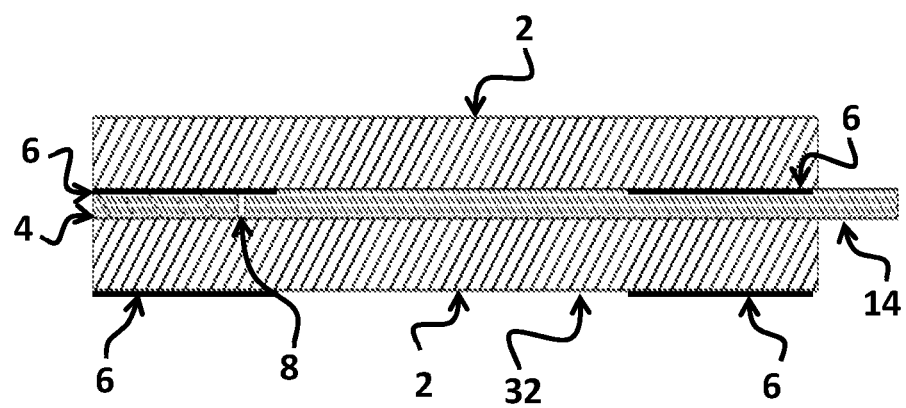
FIG. 12A Cross section of camera optics with insert according to a second embodiment.
Figure 12B:
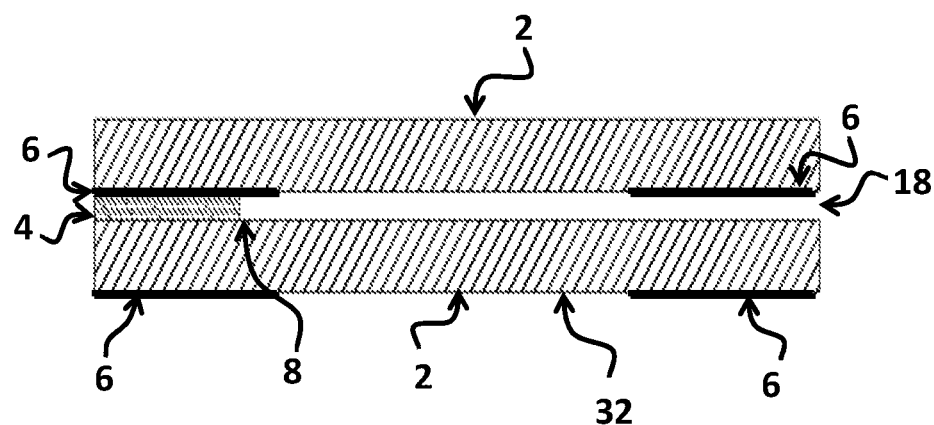
FIG. 12B Cross section of camera optics with insert removed according to a second embodiment.
Figure 13A:
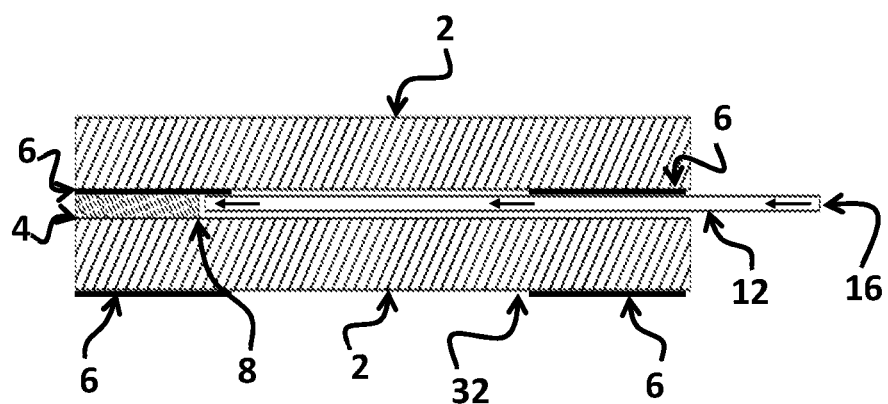
FIG. 13A Cross section of camera optics with filling tubes inserted according to a second embodiment.
Figure 13B:
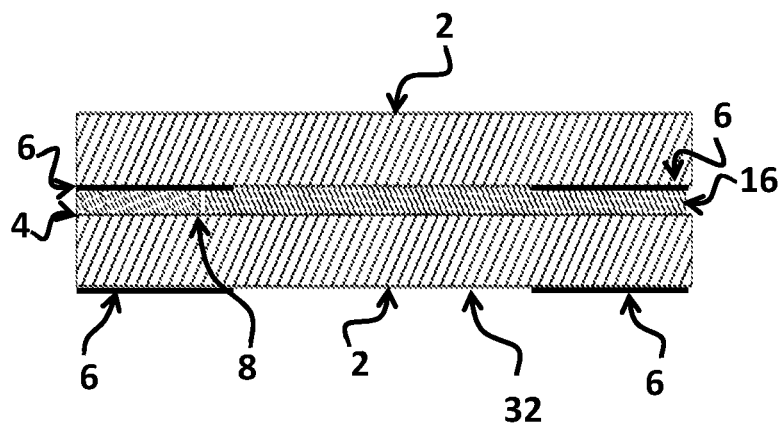
FIG. 13B Cross section of camera optics with laminating resin in place according to a second embodiment.

H. The windshield has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and a rectangular tab 28 section having a width of 24 mm connecting the edge of glass to the main cutout area. An insert 14, with perforations 20, that is 0.5 mm smaller than the cutout 8 and with tabs 28 that extend 6 mm beyond the edge of glass, is made from 0.76 mm silicon rubber as illustrated in FIG. 8. The tabs 28 should extend outboard of the edge of glass to facilitate removal after lamination. At the same time, the extended portion must not interfere with lamination. An extension of 6 mm allows for the use of vacuum channels to de-air the assembly without modification. After bending, the glass layers 201 and 202 are assembled and the insert 14 is placed between the glass layers in the cutout 8. The assembly is then laminated. After lamination, the insert 14 is removed from the laminate, by pulling on the tabs, one at a time, causing the perforations 26 to tear and the insert to separate and unfold, leaving behind a void 18. The laminate is placed in the vertical position and the fill tube 12 needles are inserted into the void. A transparent optical laminating resin 16 is then injected using a precision metering pump, into the void 18. The fill tube needles 12 are withdrawn as the level of the resin 16 rises. Agitation and vacuum may be used, if needed, to remove air. The resin may be cured by means of ultra-violet light.

I. The windshield has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and a rectangular tab 28 section having a width of 12 mm and a length of 30 mm connecting the edge of glass to the main cutout area. A plate 14 is made from 3 mm steel fully covering and extending from the edge of glass to at least 12 mm beyond the outer edge of the inboard portions of the cutout. A grove is cut in the plate and the plate is fitted with a 3 mm diameter o-ring 22. After bending, the glass layers 201 and 202 are assembled and a plate 14 is placed on the 101 and 104 surface of the two glass layers positioned so as to cover the cutout 8 area in the plastic layer. The plates are held in place by tape. The assembly is then laminated. After lamination, the plates 14 are removed from the laminate. The laminate is placed in the vertical position and the fill tube 12 needle is inserted into the void. A transparent optical laminating resin 16 is then injected using a precision metering pump, into the void 18. The fill tube needle 12 is withdrawn as the level of the resin 16 rises. Agitation and vacuum may be used, if needed, to remove air. The resin is cured by means of ultra-violet light.

J. The windshield has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and is located with the top edge of the cutout located approximately 75 mm from the top edge of glass. A plate 14 is made from 3 mm steel fully covering and extending from the edge of glass to at least 12 mm beyond the outer edge of the inboard portions of the cutout. A grove is cut in the plate and the plate is fitted with a 3 mm diameter o-ring 22. After bending, the glass layers 201 and 202 are assembled and a plate 14 is placed on the 101 and 104 surface of the two glass layers positioned so as to cover the cutout 8 area in the plastic layer. The plates are held in place by tape. The assembly is then laminated. After lamination, the plates 14 are removed from the laminate. The laminate is placed in the vertical position and the fill tube 12 needle is inserted into the void. A transparent optical laminating resin 16 is then injected using a precision metering pump, into the void 18. The fill tube needle 12 is withdrawn as the level of the resin 16 rises. Agitation and vacuum may be used, if needed, to remove air. The resin is cured by means of ultra-violet light.

K. The windshield of FIG. 3, has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and is located with the top edge of the cutout located approximately 75 mm from the top edge of glass. After bending, a tapered rectangular inset is place within the cutout area to prevent breakage during assembly. The assembly is then laminated. After lamination the laminate is placed in the vertical position and the fill tube 12 needle is inserted into the void. A transparent optical laminating resin 16 is then injected using a precision metering pump, into the void 18. The fill tube needle 12 is withdrawn as the level of the resin 16 rises. Agitation and vacuum may be used, if needed, to remove air. The resin is cured by means of ultra-violet light.

L. A LASER 26 is used to create a hole 24 in the inner glass layer of the windshield of embodiment 5 which is then used to provide fill the void. The hole 24 itself is also filled with laminating resin and the resin is then cured.

M. A LASER 26 is used to ablate the PVB of the windshield of embodiment 5 creating a channel which is then used to fill the void with laminating resin. The channel itself is also filled with laminating resin and the resin is then cured.

N. The windshield has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and a rectangular tab 28 section having a width of 12 mm and a length of 30 mm connecting the edge of glass to the main cutout area. A plate 14 is made from 3 mm steel fully covering and extending from the edge of glass to at least 12 mm beyond the outer edge of the inboard portions of the cutout. A grove is cut in the plate and the plate is fitted with a 3 mm diameter o-ring 22. After bending, the glass layers 201 and 202 are assembled and a plate 14 is placed on the surface 101 and 104 of the two glass layers positioned so as to cover the cutout 8 area in the plastic layer. The plates are held in place by tape. The assembly is then laminated. After lamination, the plates 14 are removed from the laminate. The laminate is placed in the vertical position and the fill tube 12 needle is inserted into the void. A transparent optical laminating resin 16 is then injected using a precision metering pump, into the void 18. The fill tube needle 12 is withdrawn as the level of the resin 16 rises. Agitation and vacuum may be used, if needed, to remove air. The resin is cured by means of ultra-violet light.

O. The windshield has a standard 2.1 mm thick exterior glass layer 201 and 2.1 mm interior glass layer 202. Black frit is applied to the surface two 102 and the surface four 104. The black frit frames the camera viewing area and also served to obscure the boundary between the PVB and the resin 16. In the camera field of view area, a cutout 8 made in the 0.76 mm thick PVB plastic bonding layer 4. The cutout 8 has a depth of about 170 mm and a width of about 175 mm and is located with the top edge of the cutout located approximately 75 mm from the top edge of glass. A plate 14 is made from 3 mm steel fully covering and extending from the edge of glass to at least 12 mm beyond the outer edge of the inboard portions of the cutout. A grove is cut in the plate and the plate is fitted with a 3 mm diameter o-ring 22. After bending, the glass layers 201 and 202 are assembled and a plate 14 is placed on the surface 101 and 104 of the two glass layers positioned so as to cover the cutout 8 area in the plastic layer. The plates are held in place by tape. The assembly is then laminated. After lamination, the plates 14 are removed from the laminate. The laminate is placed in the vertical position and the fill tube 12 needle is inserted into the void. A transparent optical laminating resin 16 is then injected using a precision metering pump, into the void 18. The fill tube needle 12 is withdrawn as the level of the resin 16 rises. Agitation and vacuum may be used, if needed, to remove air. The resin is cured by means of ultra-violet light.

It must be understood that this invention is not limited to the embodiments described and illustrated above. A person skilled in the art will understand that numerous variations and modifications can be carried out that do not depart from the spirit of the invention, which is only defined by the following claims.

What is claimed is:

1. A laminated glazing having a region with superior optical quality, comprising:
    an exterior glass layer;
    an interior glass layer;
    at least one plastic bonding layer placed between the exterior and interior glass layers, wherein said at least one plastic bonding layer comprises a cutout area in the region with superior optical quality;
    a cured laminating resin cured from liquid to solid filling the void left by the cutout area between glass layers;
    wherein the cured laminating resin is made of a different material than that of the at least one plastic bonding layer; and
    wherein the cured laminating resin has an index of refraction that matches to those of the glass layers.

2. The laminated glazing of claim 1, further comprising an infra-red reflecting coating or an infra-red reflecting film.

3. The laminated glazing of claim 1, wherein at least one of the glass layers is a cold bent glass layer.

4. The laminated glazing of claim 1, wherein at least one of the glass layers is chemically tempered.

5. The laminated glazing of claim 1, wherein the cured laminating resin is a UV-curable resin.

6. The laminated glazing of claim 1, wherein the cured laminating resin has a coefficient of thermal expansion similar to that of said at least one plastic bonding layer.

7. The laminated glazing of claim 1, wherein said at least one plastic bonding layer is selected from the group consisting of polyvinyl butyl (PVB), ethylene vinyl acetate (EVA) and thermoplastic polyurethane (TPU).

8. The laminated glazing of claim 1, further comprising a black obscuration applied on at least one of the glass layers to hide the boundary between the cured laminating resin and said at least one plastic bonding layer.

9. The laminated glazing of claim 1, wherein the cutout extends to the edge of the laminated glazing.

10. The laminated glazing of claim 1, further comprising a tapered insert having an outer edge and inner edge placed within the cutout area of said at least one plastic bonding layer; wherein the thickness of the outer edge is no greater than that of said at least one plastic bonding layer and which decreases uniformly towards the inner edge.

11. A method for producing a laminated glazing having a region with superior optical quality, comprising:
    providing an exterior glass layer, an interior glass layer and at least one plastic bonding layer between the exterior glass layer and the interior glass layer;

making a cutout area in said at least one plastic bonding layer in the region with superior optical quality;
placing an insert sized to fit within the cutout area of said at least one plastic bonding layer;
laminating the glazing;
injecting a laminating resin into the cutout area;
curing the resin from liquid to solid filling the void left by the cutout area between the glass layers;
wherein the cured laminating resin has an index of refraction that matches to those of the glass layers; and
wherein the cured laminating resin is made of a different material than that of the at least one plastic bonding layer.

12. The method of claim 11, further comprising, between the step of laminating the glazing and the step of injecting a laminating resin, a step of: removing the insert from laminate.

13. The method of claim 12, wherein the insert is provided with at least one tab portion that extends to the edge of the laminated glazing.

14. The method of claim 13, wherein the insert is provided with a serpentine shape.

15. The method of claim 13, wherein the insert is provided with perforations.

16. The method of claim 11, wherein the insert is of a thickness that is about the same as the plastic bonding layer.

17. A method for producing a laminated glazing having a region with superior optical quality, comprising:
providing an exterior glass layer, an interior glass layer and at least one plastic bonding layer between the exterior glass layer and the interior glass layer;
making a cutout area in said at least one plastic bonding layer in the region with superior optical quality;
providing a set of at least two plates sized larger than the cutout area;
mounting the plates to the exterior surfaces of the glass layers with sealing means such that the plates cover the cutout area;
laminating the glazing;
removing the plates from laminate after lamination process;
filling the void left by the cutout area with a laminating resin;
curing the resin from liquid to solid;
wherein the cured laminating resin has an index of refraction that matches to those of the glass layers; and
wherein the cured laminating resin is made of a different material than that of the at least one plastic bonding layer.

18. A method for producing a laminated glazing having a region with superior optical quality, comprising:
providing an exterior glass layer, an interior glass layer and at least one plastic bonding layer between the exterior glass layer and the interior glass layer;
making at least one cutout area in said at least one plastic bonding layer in the region with superior optical quality;
pre-laminating the glazing;
creating an opening through the interior glass layer in the region with superior optical quality;
injecting a laminating resin into the cutout area through the opening;
curing the resin from liquid to solid filling the void left by the cutout area between the glass layers;
laminating the glazing;
wherein the cured laminating resin has an index of refraction that matches to those of the glass layers; and
wherein the cured laminating resin is made of a different material than that of the at least one plastic bonding layer.

19. A method for producing a laminated glazing having a region with superior optical quality, comprising:
providing an exterior glass layer, an interior glass layer and at least one plastic bonding layer between the exterior glass layer and the interior glass layer;
laminating the glazing;
making a cutout area in said at least one plastic bonding layer in the region with superior optical quality by an ablation process to create a fill channel that extends to the edge of the laminated glazing;
injecting a laminating resin through the channel;
curing the resin from liquid to solid filling the void left by the cutout area between the glass layers;
wherein the cured laminating resin has an index of refraction that matches to those of the glass layers; and
wherein the cured laminating resin is made of a different material than that of the at least one plastic bonding layer.

* * * * *